(12) United States Patent
Noh et al.

(10) Patent No.: US 11,693,558 B2
(45) Date of Patent: Jul. 4, 2023

(54) METHOD AND APPARATUS FOR DISPLAYING CONTENT ON DISPLAY

(71) Applicant: Samsung Electronics Co., Ltd., Gyeonggi-do (KR)

(72) Inventors: Euihwa Noh, Gyeonggi-do (KR); Andrew Joseph Dickerson, Allen, TX (US); James Edward Vandenheuvel, Sachse, TX (US); Jordan Daniel Goulding, Allen, TX (US); Kitae Kim, McKinney, TX (US); Lam Nguyen, Richardson, TX (US); Jiyoon Park, Gyeonggi-do (KR); Yilee Seo, Gyeonggi-do (KR); Jaemin Joo, Gyeonggi-do (KR); Seungjun Hyun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/341,556

(22) Filed: Jun. 8, 2021

(65) Prior Publication Data

US 2022/0391085 A1    Dec. 8, 2022

(51) Int. Cl.
*G06F 3/048* (2013.01)
*G06F 3/04886* (2022.01)
*G06F 1/16* (2006.01)

(52) U.S. Cl.
CPC ........ *G06F 3/04886* (2013.01); *G06F 1/1641* (2013.01); *G06F 1/1643* (2013.01); *G06F 1/1652* (2013.01); *G06F 1/1677* (2013.01); *G06F 2203/04803* (2013.01)

(58) Field of Classification Search
None
See application file for complete search history.

(56) References Cited

U.S. PATENT DOCUMENTS

| 8,005,518 B1 * | 8/2011 | Birsel ............... G06F 3/04886 455/90.3 |
| 9,152,225 B2 | 10/2015 | Park et al. |
| 9,686,873 B2 | 6/2017 | Mycroft et al. |
| 9,754,520 B2 | 9/2017 | Kwon et al. |

(Continued)

FOREIGN PATENT DOCUMENTS

| JP | 2009-205565 A | 9/2009 |
| JP | 2012-502580 A | 1/2012 |

(Continued)

OTHER PUBLICATIONS

International Search Report dated Jun. 27, 2022.

*Primary Examiner* — Hua Lu
(74) *Attorney, Agent, or Firm* — Cha & Reiter, LLC

(57) ABSTRACT

According to an aspect of the disclosure, a method for displaying content on a display of an electronic device comprises determining, based on information about the content, a first region of the display on which a first portion of the content is to be displayed; obtaining an angle between the first region and a second region of the display, the second region being distinguished from the first region; generating, based on the angle and a location of a user, correction content corresponding to a second portion of the content; and displaying the first portion on the first region, and displaying the correction content on the second region.

16 Claims, 34 Drawing Sheets

(56) References Cited

U.S. PATENT DOCUMENTS

| | | | |
|---|---|---|---|
| 10,062,362 B2* | 8/2018 | Kwak | G06F 1/165 |
| 11,100,900 B2* | 8/2021 | Park | G09G 3/3291 |
| 11,144,095 B2 | 10/2021 | La et al. | |
| 11,372,446 B2 | 6/2022 | Wi et al. | |
| 2006/0290688 A1 | 12/2006 | Chae et al. | |
| 2009/0219247 A1 | 9/2009 | Watanabe et al. | |
| 2010/0060547 A1 | 3/2010 | Bloebaum et al. | |
| 2012/0280924 A1* | 11/2012 | Kummer | G06F 1/1647 |
| | | | 345/173 |
| 2013/0222276 A1* | 8/2013 | Kim | G06F 1/1643 |
| | | | 345/173 |
| 2013/0229324 A1* | 9/2013 | Zhang | G06F 3/1446 |
| | | | 345/1.3 |
| 2013/0321264 A1* | 12/2013 | Park | G06F 3/01 |
| | | | 345/156 |
| 2014/0015743 A1* | 1/2014 | Seo | G06F 1/3262 |
| | | | 345/156 |
| 2014/0028596 A1* | 1/2014 | Seo | G06F 3/0487 |
| | | | 345/173 |
| 2014/0049464 A1* | 2/2014 | Kwak | G06F 3/017 |
| | | | 345/156 |
| 2014/0055429 A1* | 2/2014 | Kwon | G09G 3/035 |
| | | | 345/204 |
| 2014/0098028 A1* | 4/2014 | Kwak | G06F 1/1652 |
| | | | 345/173 |
| 2014/0267097 A1* | 9/2014 | Lee | G06F 3/0416 |
| | | | 361/679.01 |
| 2015/0022472 A1* | 1/2015 | Jung | G06F 3/0487 |
| | | | 345/173 |
| 2015/0116218 A1* | 4/2015 | Yang | G06F 3/0486 |
| | | | 345/158 |
| 2015/0220119 A1* | 8/2015 | Seo | G09G 5/37 |
| | | | 345/173 |
| 2015/0227308 A1* | 8/2015 | Kim | G06F 3/0483 |
| | | | 715/769 |
| 2015/0286457 A1* | 10/2015 | Kim | G06F 3/1446 |
| | | | 345/1.3 |
| 2015/0309704 A1* | 10/2015 | Bae | G06F 3/04883 |
| | | | 715/765 |
| 2015/0348453 A1* | 12/2015 | Jin | G09F 9/301 |
| | | | 345/173 |
| 2015/0373863 A1* | 12/2015 | Lin | A45C 13/004 |
| | | | 206/774 |
| 2016/0034047 A1* | 2/2016 | Lee | G06F 3/013 |
| | | | 345/156 |
| 2016/0162241 A1* | 6/2016 | An | G06F 1/1641 |
| | | | 345/1.3 |
| 2016/0198100 A1* | 7/2016 | Cho | G06F 3/012 |
| | | | 348/222.1 |
| 2016/0324023 A1* | 11/2016 | Kim | G06F 1/1681 |
| 2016/0327987 A1* | 11/2016 | Huitema | G04G 17/045 |
| 2016/0349858 A1* | 12/2016 | Lee | G06F 1/1652 |
| 2017/0017313 A1* | 1/2017 | Rakshit | G09G 3/035 |
| 2017/0034446 A1* | 2/2017 | Park | H04N 5/23219 |
| 2017/0052566 A1* | 2/2017 | Ka | H04R 3/12 |
| 2017/0068381 A1* | 3/2017 | Choi | G06F 3/1423 |
| 2017/0069299 A1* | 3/2017 | Kwak | G09G 5/37 |
| 2017/0104855 A1* | 4/2017 | Lee | G06F 3/041 |
| 2017/0185215 A1* | 6/2017 | Kim | G06F 1/1694 |
| 2017/0221456 A1* | 8/2017 | Kim | G09G 3/035 |
| 2018/0032152 A1* | 2/2018 | Pan | G06F 3/0346 |
| 2018/0039408 A1* | 2/2018 | Cheong | G06F 3/0481 |
| 2018/0108330 A1* | 4/2018 | Wallace | G06F 1/1652 |
| 2018/0137801 A1* | 5/2018 | An | G06T 3/0093 |
| 2019/0042066 A1* | 2/2019 | Kim | G06F 3/1446 |
| 2019/0197664 A1* | 6/2019 | Chae | G06T 3/60 |
| 2019/0261519 A1* | 8/2019 | Park | H05K 5/0017 |
| 2019/0278334 A1* | 9/2019 | Chen | G06F 1/1652 |
| 2019/0340964 A1 | 11/2019 | Kwon et al. | |
| 2020/0125144 A1* | 4/2020 | Chung | G01B 11/26 |
| 2020/0126519 A1* | 4/2020 | Heo | G06F 3/04842 |
| 2020/0192432 A1* | 6/2020 | Yee | G06F 1/1675 |
| 2020/0357362 A1* | 11/2020 | Shin | G09G 3/035 |
| 2020/0394984 A1* | 12/2020 | Park | G09G 3/3266 |
| 2021/0064088 A1* | 3/2021 | Kim | H04M 1/0216 |
| 2021/0405692 A1* | 12/2021 | Zhang | G06F 1/1641 |
| 2022/0004017 A1* | 1/2022 | Choi | G02B 27/4233 |
| 2022/0121244 A1 | 4/2022 | Kwon | |

FOREIGN PATENT DOCUMENTS

| | | |
|---|---|---|
| KR | 10-2013-0000392 A | 1/2013 |
| KR | 10-2014-0094958 A | 7/2014 |
| KR | 10-2017-0028193 A | 3/2017 |
| KR | 10-1912252 B1 | 10/2018 |
| KR | 10-1943357 B1 | 1/2019 |
| KR | 10-2004409 B1 | 7/2019 |
| KR | 10-2020-0122076 A | 10/2020 |
| KR | 10-2020-0142394 A | 12/2020 |
| KR | 10-2256681 B1 | 5/2021 |
| KR | 10-2256702 B1 | 5/2021 |
| WO | 2021/244152 A1 | 12/2021 |

* cited by examiner

METHOD AND APPARATUS FOR DISPLAYING CONTENT ON DISPLAY

BACKGROUND

1. Field

The disclosure relates to a method and apparatus for displaying content on a display.

2. Description of the Related Art

Electronic devices can include a foldable or rollable displays. Foldable and rollable displays can be advantageous, among other reasons, because they allow the benefit of a larger screen while maintaining the portability of the device.

However, when a flexible display is divided into two or more regions, as a result of bending one region of the display to have an angle with respect to the other region of the display ("folding"), a problem can occur because size of an object in the content to be displayed may have to be reduced to a size of a designated region of a display. As a result, a part of a region of the display may be wasted.

The content displayed on a display appears distorted when the line of sight to portions of the display is not orthogonal. While this may be corrected by performing an image transformation, based on the line of sight, it becomes particularly difficult when the display is folded. When the display is folded, angle of the line of sight will be different for different regions.

The foregoing information is presented to allow the user to better understand the embodiments presented herein. No determination has been made as to whether any of the foregoing information is prior art.

SUMMARY

Certain embodiments of the disclosure provide a method and apparatus for displaying content on a display.

Additional aspects will be set forth in part in the description which follows and, in part, will be apparent from the description, or may be learned by practice of the presented embodiments of the disclosure.

According to an aspect of the disclosure, a method for displaying content on a display of an electronic device comprises determining, based on information about the content, a first region of the display on which a first portion of the content is to be displayed; obtaining an angle between the first region and a second region of the display, the second region being distinguished from the first region; generating, based on the angle and a location of a user, correction content corresponding to a second portion of the content; and displaying the first portion on the first region, and displaying the correction content on the second region.

According to certain aspect of the disclosure, an electronic device comprises a display; a memory storing at least one instruction; and at least one processor configured to execute the at least one instruction to perform a plurality of operations, wherein the plurality of operations comprises: determining, based on information about the content, a first region of the display on which a first portion of content is to be displayed,
obtaining an angle between the first region and a second region of the display, the second region being distinguished from the first region, generating, based on the angle and a location of a user, correction content corresponding to a second portion of the content, and displaying the first portion on the first region, and display the generated correction content on the second region.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
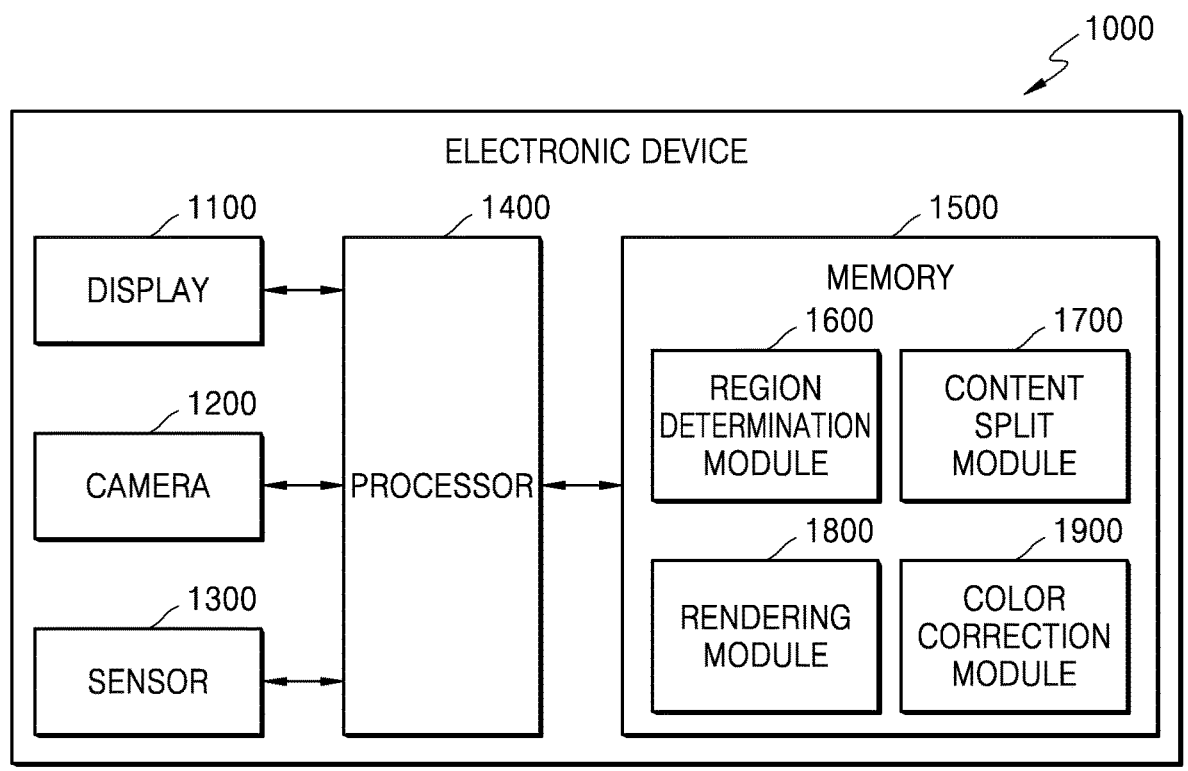
FIG. 1 is a block diagram of an electronic device, according to an embodiment of the disclosure.

Hereinafter, embodiments of the disclosure will now be described more fully with reference to the accompanying drawings.

In the descriptions of embodiments, certain detailed explanations of the related art which are well known in the art to which the disclosure belongs and are not directly related to the disclosure are omitted. By omitting unnecessary explanations, the essence of the disclosure may not be obscured and may be explicitly conveyed.

For the same reasons, in the drawings, some elements may be exaggerated, omitted, or roughly illustrated. Also, the size of each element does not exactly correspond to an actual size of each element. In the drawings, the same or corresponding elements are denoted by the same reference numerals.

Throughout the disclosure, the expression "at least one of a, b or c" indicates only a, only b, only c, both a and b, both a and c, both b and c, all of a, b, and c, or variations thereof.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed by the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, embodiments of the disclosure will now be described more fully with reference to the accompanying drawings.

FIG. 1 is a block diagram of an electronic device 1000 according to an embodiment of the disclosure.

The electronic device 1000 includes display 1100. Generally speaking, the display 1100 is planar and can be a flexible display that is capable of being folded into two regions, a first region and a second region. The first region will form an angle with the second region. A sensor 1300 detects the angle between the first region and the second region of the display 1100. As a result, content displayed on the first and second region will be viewed from different perspectives by the user. Even if the user is looking directly (the line of sight is orthogonal) at, e.g., the first region, the content that is displayed in the second region will appear distorted. According to certain embodiments, a camera 1200 determines the angle of the line of sight, at least with respect to one of the first region and second region of the display. The processor 1400 receives the angle of the first region with respect to the second region from the sensor, and the angle of the line of sight (with respect to one of the first region and second region). Based on the angles of the first region and the second region from the sensor, and the angle of the line of sight from the camera, the processor can modify content display on the first region and the second region, to correct for distortion based on the angle of the line of sight. According to an embodiment of the disclosure, the electronic device 1000 may include a display 1100, a camera 1200, a sensor 1300, a processor 1400, and a memory 1500. However, a configuration of the electronic device 1000 is not limited to the aforementioned descriptions, and thus, the electronic device 1000 may include more elements or fewer elements, depending on the embodiment.

The display 1100 may display content. The display 1100 may indicate a flexible display. The flexible display may refer to a bendable display and may include, but is not limited to, at least one of a curved display, a bendable display, a foldable display, or a rollable display. The camera 1200 may obtain user data. Based on the user data obtained by the camera 1200, a distance between a user and the electronic device 1000 and an angle between the user and the electronic device 1000 may be obtained (or the angle of the line of sight). For example, the camera 1200 may include an eye tracking camera, a depth camera (e.g., a time-of-flight (ToF) camera or a depth camera), and/or a RGB camera.

The sensor 1300 may obtain an angle between a first region and a second region of the display 1100. The sensor 1300 may include, but is not limited to, at least one of a bending sensor, a pressure sensor, a geomagnetic sensor, a tilt sensor, or a gyro sensor.

The sensor 1300 may obtain user data. Based on the user data obtained by the sensor 1300, a distance between the user and the electronic device 1000 and an angle between the user and the electronic device 1000 may be obtained. The sensor 1300 may include, but is not limited to, a dynamic vision sensor (DVS) and a low-power vision sensor.

The processor 1400 may execute at least one instruction in the memory 1500 to control all operations of the electronic device 1000. In certain embodiments, multiple processors 1400 can be used. Accordingly, the term "processor" as used herein shall be understood to mean one or more processors.

For example, based on information about the content, the processor 1400 may determine the first region of the display 1100 on which a first portion of the content is to be displayed.

The processor 1400 may split the content into the first portion and a second portion to control a length of one side of the content to be equal to a length of one side of the first region of the display 1100.

The processor 1400 may generate an image corresponding to the second portion of the content, based on the angle between the first region and the second region of the display 1100 and a location of the user. Also, the processor 1400 may generate an image corresponding to the second portion of the content, based on the angle between the first region and the second region of the display 1100 and an obtained location of the user.

The processor 1400 may determine a size and a ratio of the image so as to allow the first portion and the second portion of the content to be displayed on one virtual plane. Also, the processor 1400 may correct colors of the image.

According to an embodiment of the disclosure, the memory 1500 may include a region determination module 1600, a content split module 1700, a rendering module 1800, and a color correction module 1900.

According to an embodiment of the disclosure, elements (e.g., the region determination module 1600, the content split module 1700, the rendering module 1800, and/or the color correction module 1900) included in the memory 1500 may be included as software components or hardware components (or hardware modules (e.g., circuitries) additionally or alternatively in the processor 1400.

Based on at least one of information about a type of content, information about an application that provides content, information indicating whether content include text content, or information indicating whether content and a user interface (UI) to receive a user input overlay each other, the region determination module 1600 may store instructions for determining the first region of the display 1100 on which the first portion of the content is to be displayed.

The content split module 1700 may store instructions for splitting the content into a first portion and a second portion to control a length of one side of the content to be equal to a length of one side of the first region.

The rendering module 1800 may store instructions for generating an image corresponding to the second portion of the content, based on the angle between the first region and the second region of the display 1100 and a location of the user, and for determine a size and a ratio of the image so as to allow the first portion and the second portion of the content to be displayed on one virtual plane.

The color correction module 1900 may store instructions for correcting colors of the image.

Figure 2A:
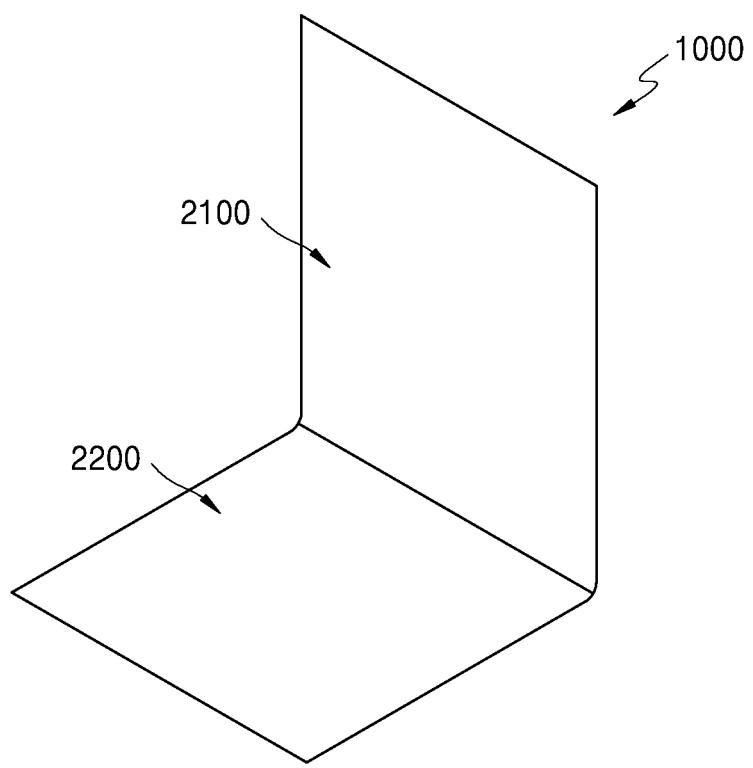
FIG. 2A is a diagram for describing the electronic device, according to an embodiment of the disclosure.
Figure 2B:
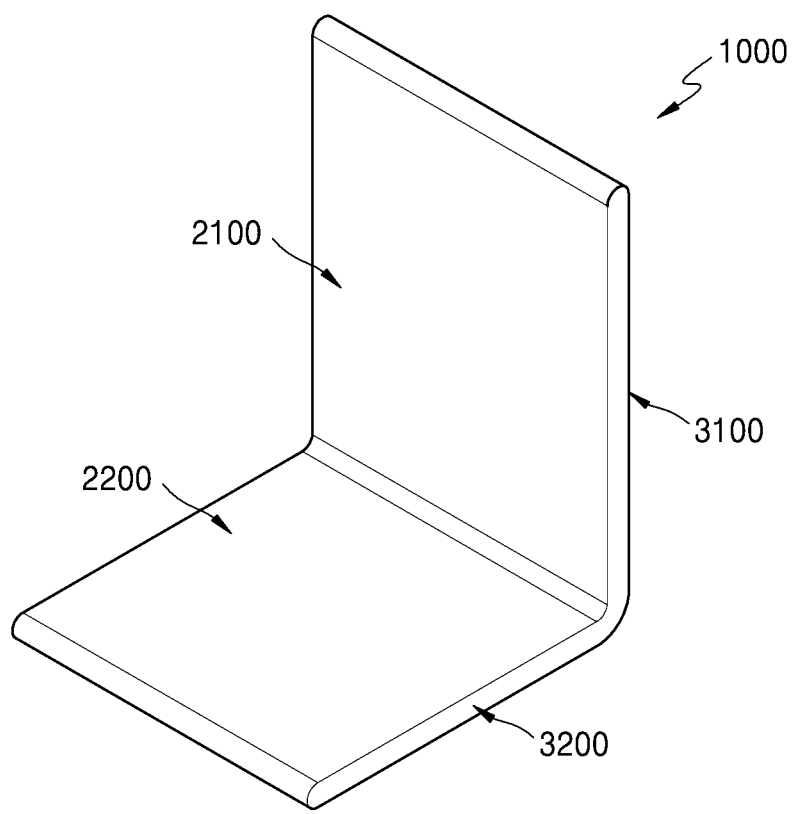
FIG. 2B is a diagram for describing the electronic device, according to an embodiment of the disclosure.

FIGS. 2A and 2B are diagrams for describing the electronic device 1000 according to an embodiment of the disclosure.

Referring to FIG. 2A, the display 1100 of the electronic device 1000 may include two or more regions. According to an embodiment of the disclosure, the display 1100 may include a first region 2100 and a second region 2200. FIG. 2A illustrates the first region 2100 and the second region 2200 which have rectangular shapes, but the disclosure is not limited thereto. With reference to FIG. 2A, the first region 2100 may be larger than the second region 2200, but the disclosure is not limited thereto.

Referring to FIG. 2B, the first region 2100 of the display 1100 may be positioned on a surface of the first housing 3100 of the electronic device 1000, and the second region 2120 may be positioned in a second housing 3200 of the electronic device 1000.

However, it shall be understood that the disclosure is not limited thereto, and thus, may be applied to other electronic devices with two or more display regions.

Figure 3:
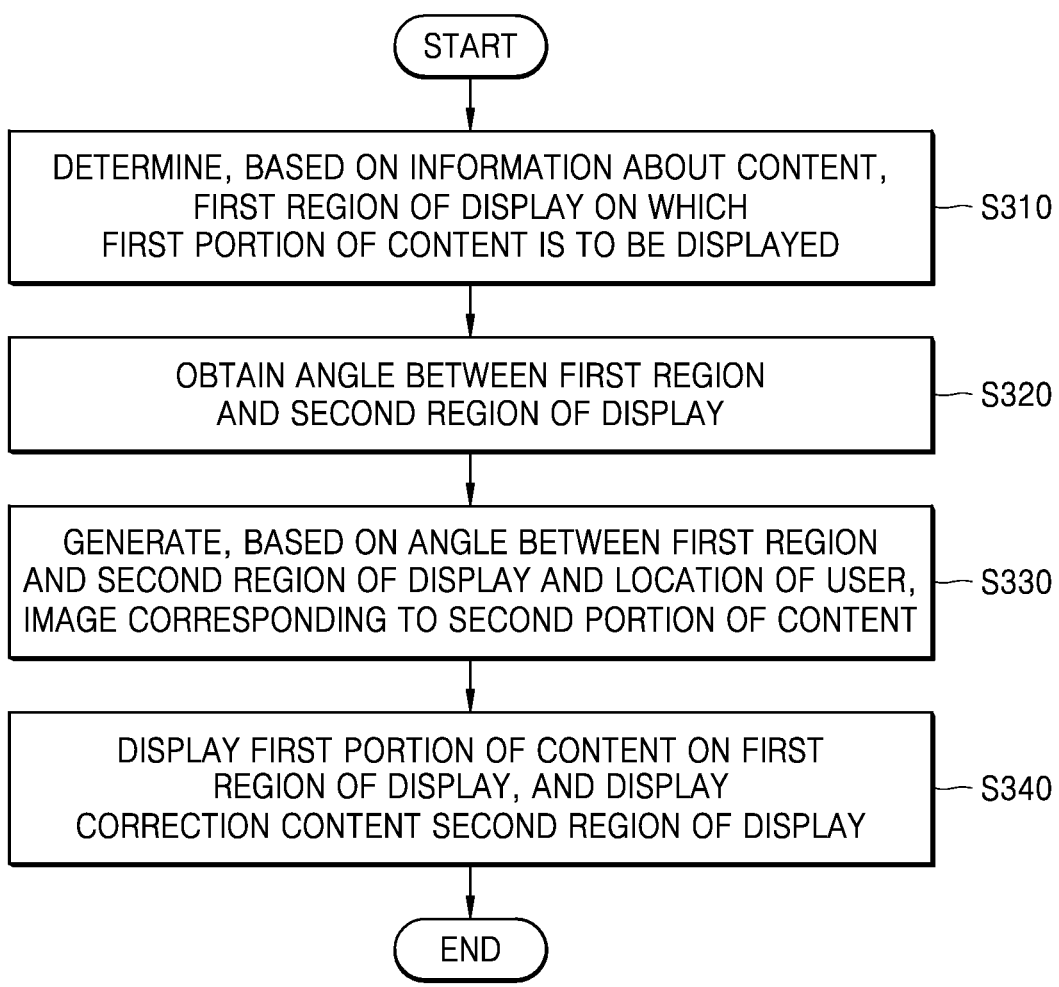
FIG. 3 is a flowchart illustrating operations in which the electronic device displays content on a display, according to an embodiment of the disclosure.

FIG. 3 is a flowchart illustrating operations in which the electronic device 1000 displays content on the display 1100 according to an embodiment of the disclosure.

Referring to FIG. 3, in operation S310, the electronic device 1000 may determine the first region 2100 of the display 1100 on which a first portion of content is to be displayed, based on information about the content. The descriptions thereof will be provided below with reference to FIGS. 7A to 9B.

In operation S320, the electronic device 1000 may obtain an angle between the first region 2100 and the second region 2200 of the display 1100. According to an embodiment of the disclosure, the electronic device 1000 may obtain the angle between the first region 2100 and the second region 2200 of the display 1100, based on data obtained by using at least one of the bending sensor, the pressure sensor, or the gyro sensor.

According to an embodiment of the disclosure, the electronic device 1000 may obtain a location of a user, based on user data obtained by the camera 1200 or the sensor 1300. In this regard, the electronic device 1000 may obtain the location of the user by using face tracking technology or the like. The location of the user may include a distance between the electronic device 1000 and the user, and an angle between the electronic device 1000 and the user, e.g., a line of sight.

The camera 1200 or the sensor 1300 may periodically or aperiodically collect user data about the user. In this regard, an interval at which the user data is obtained may be predetermined or may be changed in response to a user input.

In operation S330, the electronic device 1000 may generate correction content corresponding to a second portion of the content, based on the angle between the first region 2100 and the second region 2200 of the display 1100 and the location of the user. According to an embodiment of the disclosure, the location of the user may be deemed a predetermined default location. The predetermined default location may include a predetermined default distance and a default predetermined angle between the user and the electronic device 1000. In this regard, the predetermined default distance and the predetermined default angle between the user and the electronic device 1000 may be changed in response to a user input, such as a user input changing a setting.

According to another embodiment of the disclosure, the electronic device 1000 may generate correction content corresponding to the second portion of the content, based on the angle between the first region 2100 and the second region 2200 of the display 1100 and an obtained location of the user. The descriptions thereof will be provided below with reference to FIGS. 10A to 14C.

Whether the electronic device 1000 is to generate the correction content corresponding to the second portion of the content based on one of the predetermined location of the user or the obtained location of the user may be predetermined, or may be changed in response to a user input.

In operation S340, the electronic device 1000 may display the first portion of the content on the first region 2100 of the display 1100, and may display the correction content on the second region 2200 of the display 1100. As a result, the first portion and the second portion of the content may be displayed on one virtual plane. The descriptions thereof will be provided below with reference to FIG. 4C.

Figure 4A:
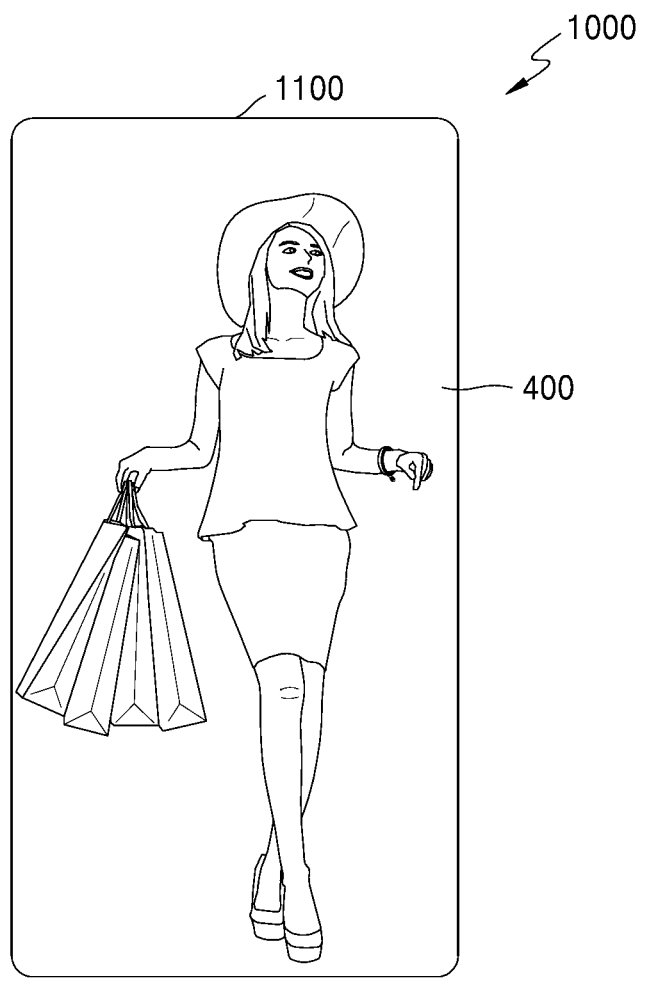
FIG. 4A is a diagram for describing a method by which the electronic device displays content on the display, according to an embodiment of the disclosure.
Figure 4B:
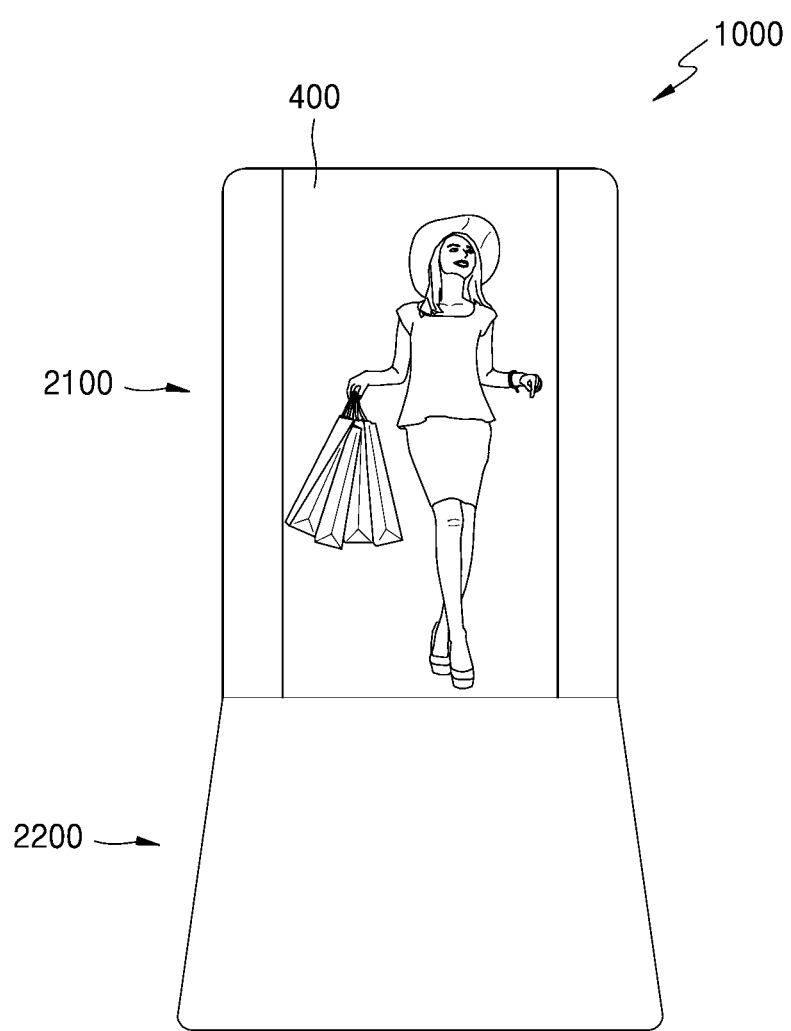
FIG. 4B is a diagram for describing a method by which the electronic device displays content on the display, according to an embodiment of the disclosure.
Figure 4C:
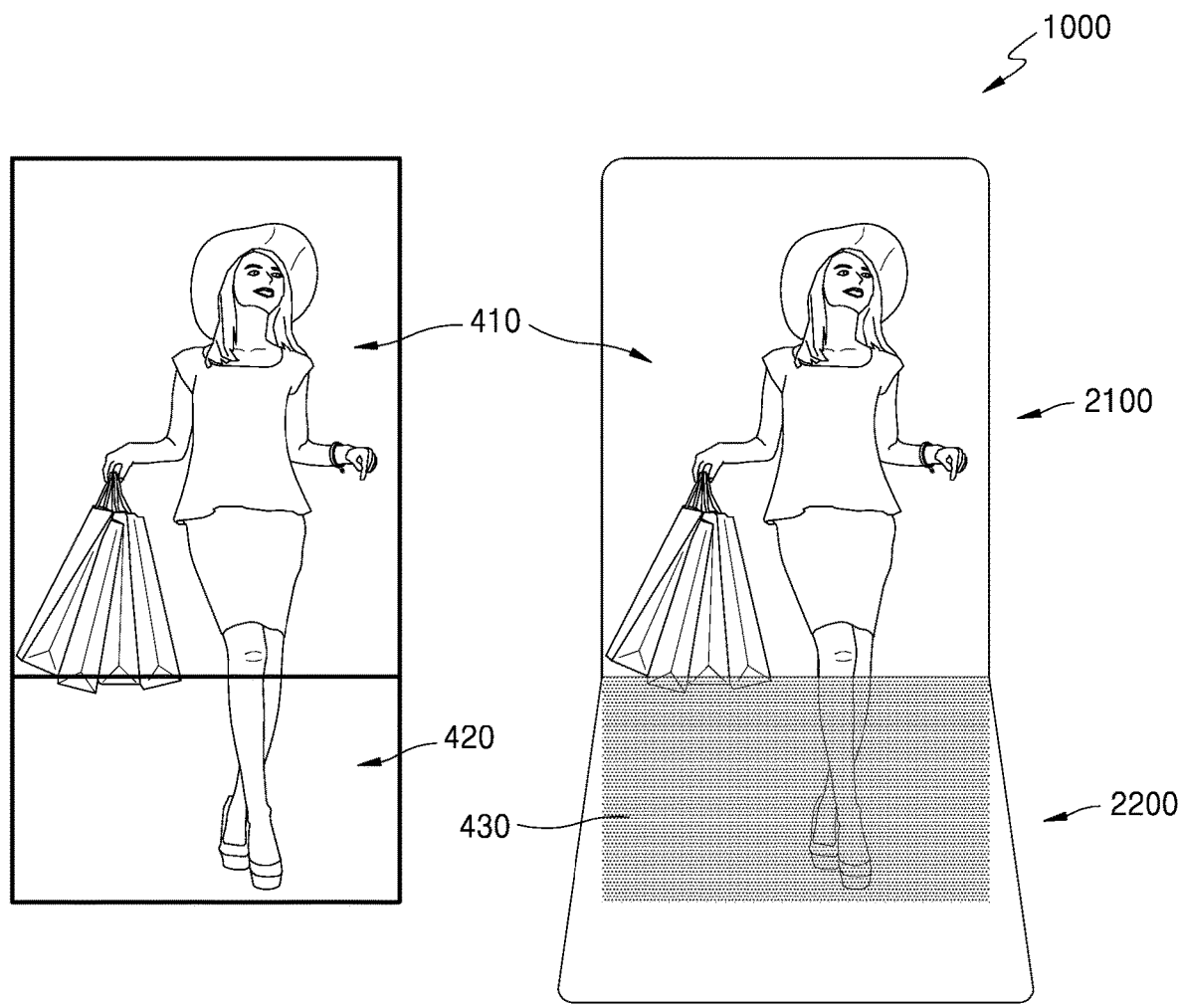
FIG. 4C is a diagram for describing a method by which the electronic device displays content on the display, according to an embodiment of the disclosure.

FIGS. 4A to 4C are diagrams for describing a method by which the electronic device 1000 displays content on the display 1100, according to an embodiment of the disclosure.

Referring to FIG. 4A, when the display 1100 includes only one region, the electronic device 1000 may display content 400 on the display 1100. In this regard, the description that the display 1100 includes only one region may mean that the display 1100 is not bent.

Referring to FIG. 4B, when the display 1100 includes two or more regions, the electronic device 1000 may display the content 400 on the first region 2100 of the display 1100. In this regard, the description that the display 1100 includes two or more regions may mean that the display 1100 is bent.

According to an embodiment of the disclosure, in order to maintain a designated ratio (e.g., 16:9) of the content 400, the electronic device 1000 may adjust a size of the content 400 to allow a length of one side of the content 400 to be equal to a length of one side of the first region 2100 of the display 1100, and then may display the content 400. For example, referring to FIG. 4B, the electronic device 1000 may adjust the size of the content 400 and display the content 400 while maintaining the ratio of the content 400 so as to allow a vertical length of the content 400 to be equal to a vertical length of the first region 2100. In this regard, the content 400 may be displayed in a seamlessly unfolded manner but display regions on both sides of the content 400 may be wasted.

Referring to FIG. 4C, when the display 1100 includes two or more regions, the electronic device 1000 may display a first portion 410 of the content 400 on the first region 2100 of the display 1100, and may display correction content 430 corresponding to a second portion 420 of the content 400 on the second region 2200 of the display 1100.

According to an embodiment of the disclosure, the electronic device 1000 may split the content 400 into the first portion 410 and the second portion 420 to allow a length of one side of the content 400 to be equal to a length of one side of the first region 2100 of the display 1100. For example, referring to FIG. 4C, the electronic device 1000 may adjust a size of the content 400 while maintaining a ratio of the content 400 so as to allow a horizontal length of the content 400 to be equal to a horizontal length of the first region 2100. Afterward, the electronic device 1000 may determine a piece of the content 400, which corresponds to a size of the first region 2100, to be the first portion 410, and may determine the second portion 420 as a piece other than the first portion 410.

According to an embodiment of the disclosure, the electronic device 1000 may determine a size and a ratio of the correction content 430 so as to display the first portion 410 and the second portion 420 of the content 400 on one virtual plane, based on a location of a user and an angle between the first region 2100 and the second region 2200.

In this regard, the description that the first portion 410 and the second portion 420 are displayed on one virtual plane may mean that the content 400 may be displayed as if the content 400 is seamlessly unfolded, regardless of whether the display 1100 is bent. For example, referring to FIG. 4C, the electronic device 1000 may determine the size and the ratio of the correction content 430, based on the location of the user and the angle between the first region 2100 and the second region 2200, and may display the first portion 410 of the content 400 on the first region 2100, and may display the correction content 430 on the second region 2200. As a result, even when the display 1100 is bent, the content 400 may be viewed as if the content 400 is seamlessly unfolded. Compared to FIG. 4B, the electronic device 1000 may provide the user with content with a larger screen, without a wasted display region, and thus, may provide the user with an experience in which the user can immerse himself/herself in the content.

In certain embodiments, the processor 1400 can generate correction content for the second portion 420 by performing a graphical transformation of the second portion 420. For example, if the angle between the first region 2100 and the second region 2200 is θ (about the X-axis horizontal), in certain embodiments, the correction content 430 can be the second portion 420 projected onto a plane having a 180−θ degree angle about the same axis (x-axis) with the top of the second portion 420. In certain embodiments, the correction content 430 can be determined by calculating the perspective of a pinhole camera as though it was tilted by 180−θ degrees about the same axis using a perspective transformation.

According to an embodiment of the disclosure, when the correction content 430 and a UI to receive a user input overlay each other, the electronic device 1000 may correct and display colors of the correction content 430.

Figure 5A:
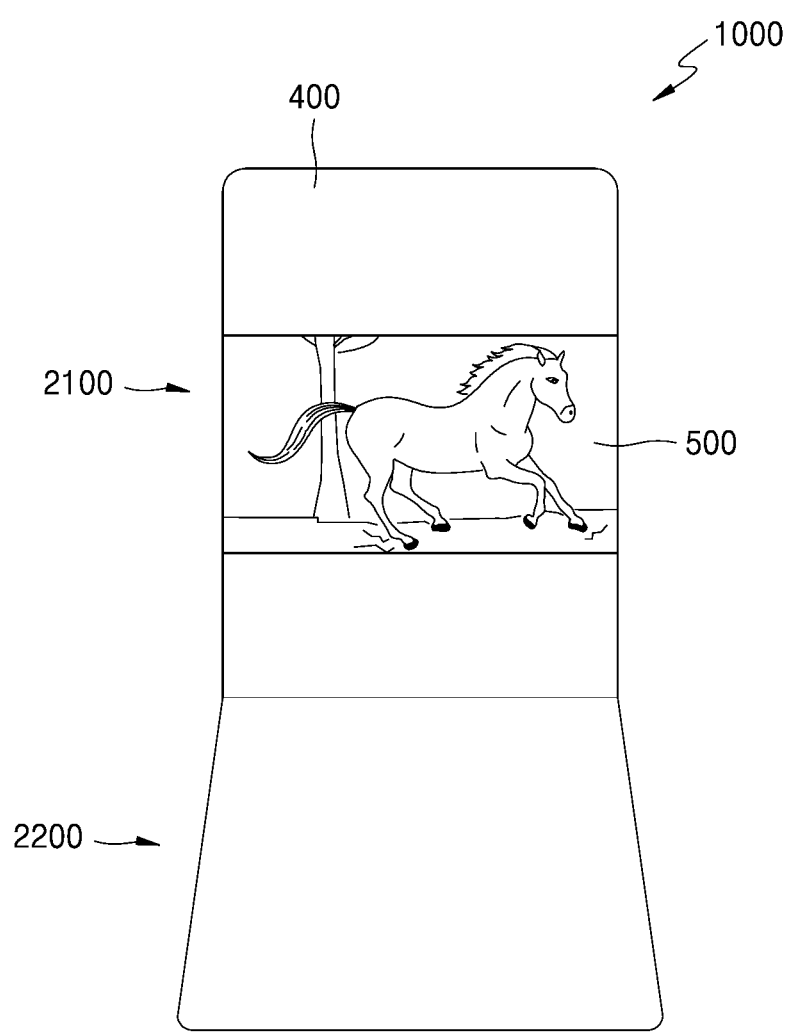
FIG. 5A is a diagram for describing a method by which the electronic device displays content on the display, according to an embodiment of the disclosure.
Figure 5B:
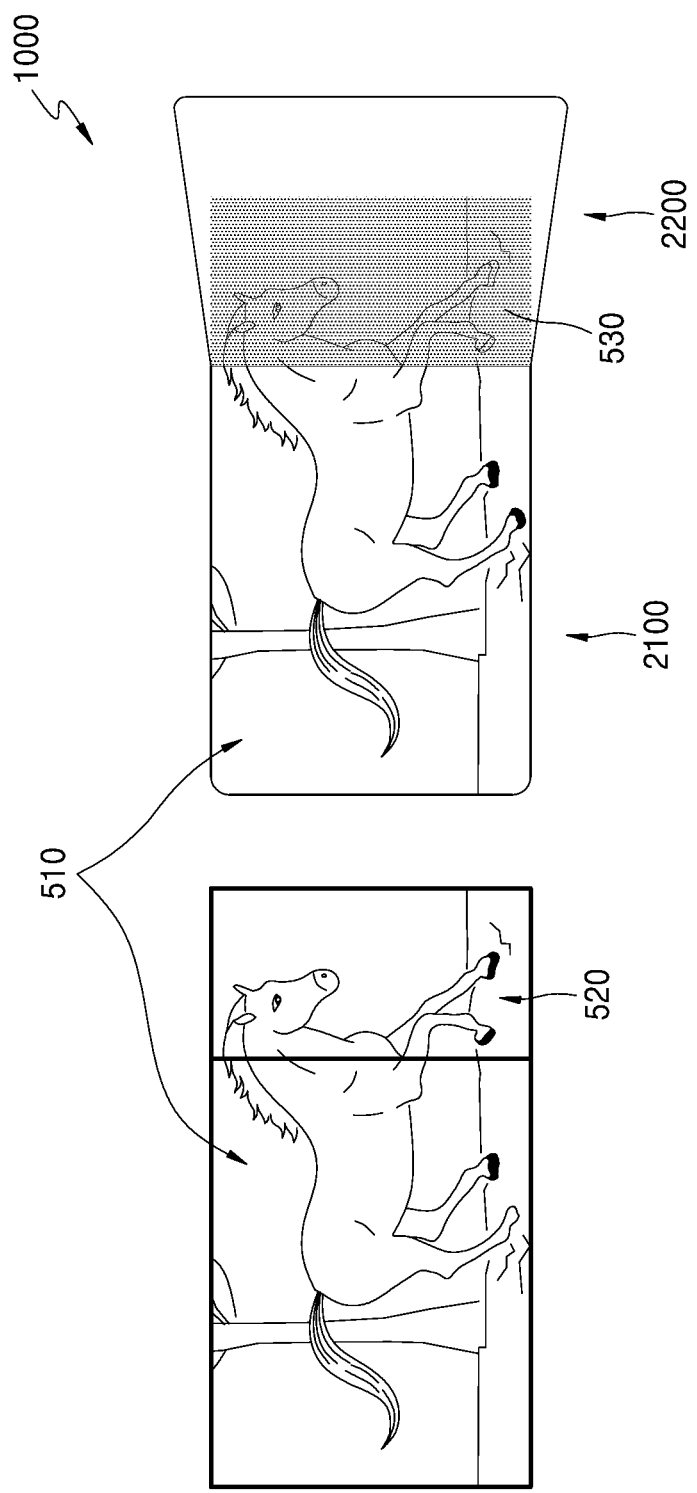
FIG. 5B is a diagram for describing a method by which the electronic device displays content on the display, according to an embodiment of the disclosure.

FIGS. 5A and 5B are diagrams for describing a method by which the electronic device 1000 displays content on the display 1100, according to an embodiment of the disclosure.

Referring to FIG. 5A, when the display 1100 includes two or more regions, the electronic device 1000 may display content 500 on the first region 2100 of the display 1100.

According to an embodiment of the disclosure, in order to maintain a designated ratio of the content 500, the electronic device 1000 may adjust a size of the content 500 and display the content 500 so as to allow a length of one side of the content 500 to be equal to a length of one side of the first region 2100 of the display 1100. For example, referring to FIG. 5A, the electronic device 1000 may adjust the size of the content 500 and display the content 500 while maintaining a ratio of the content 500 so as to allow a horizontal length of the content 500 to be equal to a horizontal length of the first region 2100.

Referring to FIG. 5B, when the display 1100 includes two or more regions, the electronic device 1000 may display a first portion 510 of the content 500 on the first region 2100 of the display 1100, and may display correction content 530 corresponding to a second portion 520 of the content 500 on the second region 2200 of the display 1100.

For example, referring to FIG. 5B, the electronic device 1000 may adjust the size of the content 500 while maintaining the ratio of the content 500 so as to allow a vertical length of the content 500 to be equal to a vertical length of the first region 2100. Afterward, the electronic device 1000 may determine a piece of the content 500, which corresponds to a size of the first region 2100, to be the first portion 510, and may determine the second portion 520 as a piece other than the first portion 510. The electronic device 1000 may determine a size and a ratio of the correction content 530, based on a location of a user and an angle between the first region 2100 and the second region 2200, and may display the first portion 510 on the first region 2100 and display the correction content 530 on the second region 2200. As a result, even when the display 1100 is bent, the content 500 may be viewed as if the content 500 is seamlessly unfolded.

Based on a rotation state of the electronic device 1000, the electronic device 1000 may determine whether to match a horizontal length of content with a horizontal length of the first region 2100 or to match a vertical length of the content with a vertical length of the first region 2100. In this regard, the rotation state of the electronic device 1000 may be identified, based on data obtained by using the tilt sensor or the gyro sensor.

For example, referring to FIG. 5A, when a state of the electronic device 1000 is identified, in which the electronic device 1000 rotates in a vertical direction (or a state in which a hinge of the electronic device 1000 is parallel to a horizontal plane), the electronic device 1000 may display content so as to allow the horizontal length of the content 500 to be equal to the horizontal length of the first region 2100. Alternatively, referring to FIG. 5B, when a state of the electronic device 1000 is identified, in which the electronic device 1000 rotates in a horizontal direction (or a state in which the hinge of the electronic device 1000 is perpendicular to the horizontal plane), the electronic device 1000 may display content so as to allow the vertical length of the content 500 to be equal to the vertical length of the first region 2100.

In certain embodiments, the processor 1400 can generate correction content for the second portion 520 by performing a graphical transformation of the second portion 520. For example, if the angle between the first region 2100 and the second region 2200 is θ (about the y-axis, horizontal), in certain embodiments, the correction content 530 can be the second portion 520 projected onto a plane having a 180−θ degree angle about the same axis (y-axis) with the left edge of the second portion 420. In certain embodiments, the correction content 530 can be determined by calculating the perspective of a pinhole camera as though it was tilted by 180−θ degrees about the same axis using a perspective transformation.

Figure 6A:
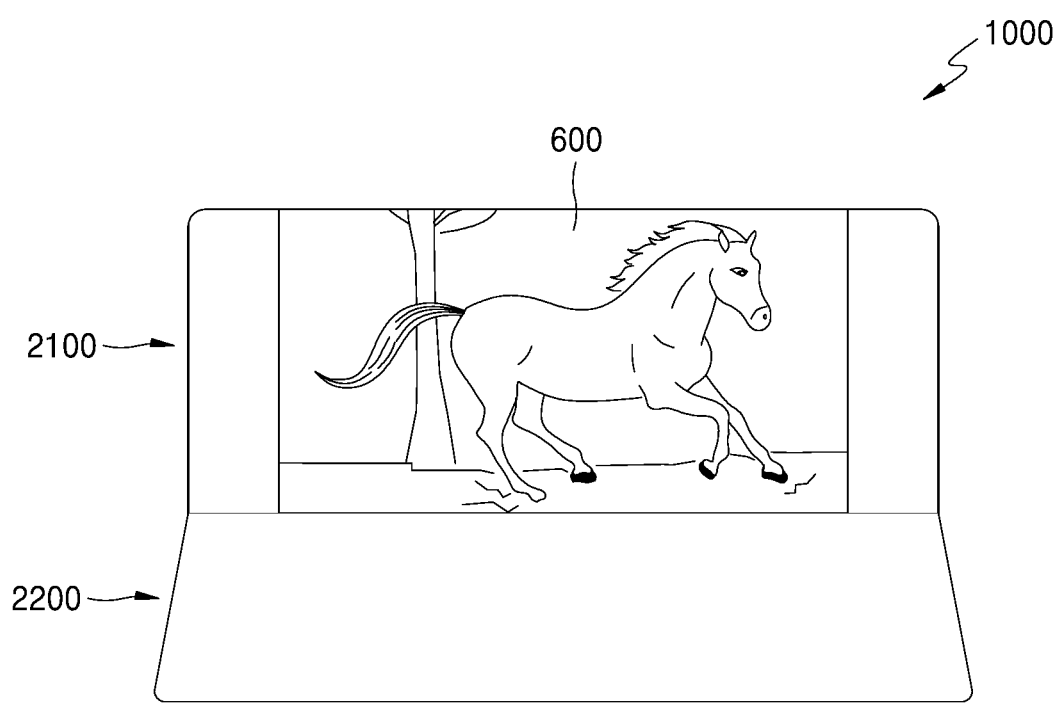
FIG. 6A is a diagram for describing a method by which the electronic device displays content on the display, according to an embodiment of the disclosure.
Figure 6B:
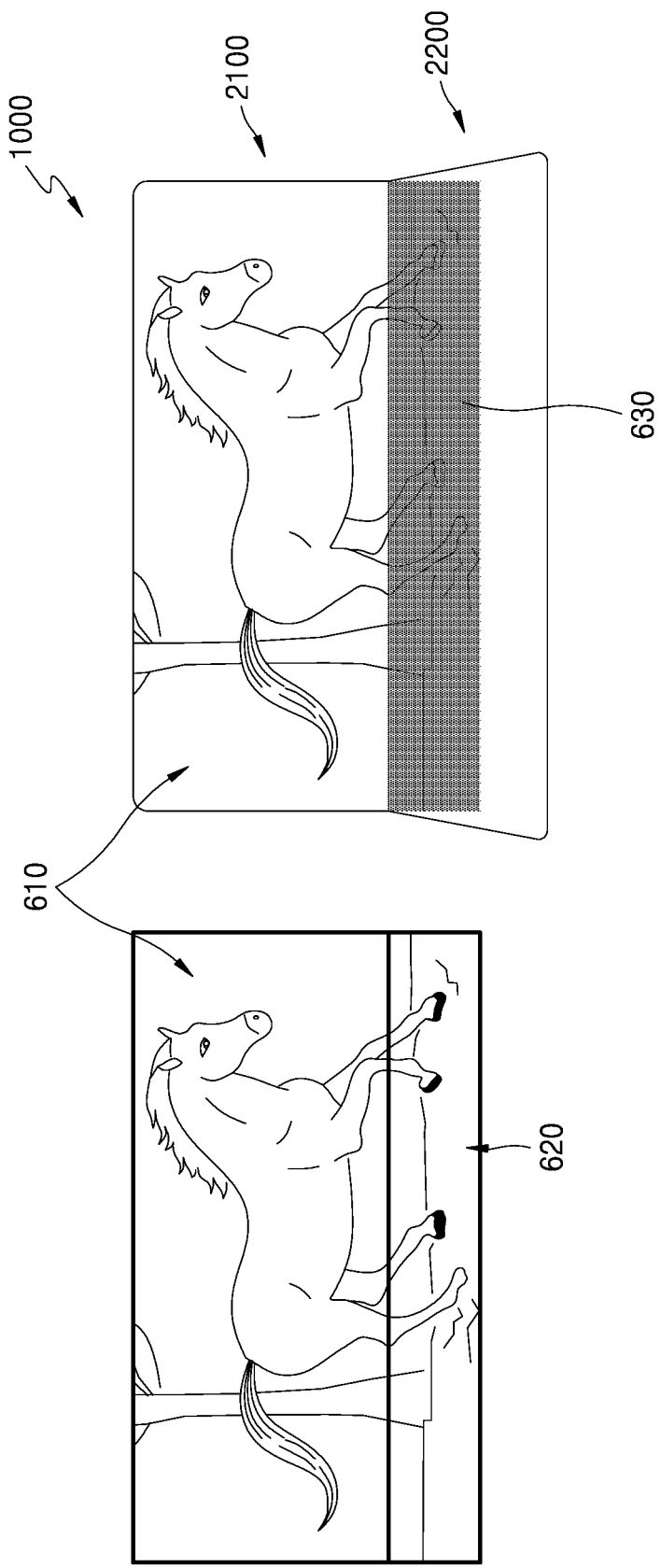
FIG. 6B is a diagram for describing a method by which the electronic device displays content on the display, according to an embodiment of the disclosure.

FIGS. 6A and 6B are diagrams for describing a method by which the electronic device 1000 displays content on the display 1100, according to an embodiment of the disclosure.

Referring to FIG. 6A, when the display 1100 includes two or more regions, the electronic device 1000 may display content 600 on the first region 2100 of the display 1100.

According to an embodiment of the disclosure, in order to maintain a designated ratio of the content 600, the electronic device 1000 may adjust a size of the content 600 and display the content 600 so as to allow a length of one side of the content 600 to be equal to a length of one side of the first region 2100 of the display 1100. For example, referring to FIG. 6A, the electronic device 1000 may adjust the size of the content 500 and display the content 500 while maintaining a ratio of the content 500 so as to allow a vertical length of the content 500 to be equal to a vertical length of the first region 2100.

Referring to FIG. 6B, when the display 1100 includes two or more regions, the electronic device 1000 may display a first portion 610 of the content 600 on the first region 2100 of the display 1100, and may display correction content 630 corresponding to a second portion 620 of the content 600 on the second region 2200 of the display 1100.

For example, referring to FIG. 6B, the electronic device 1000 may adjust the size of the content 600 while maintaining the ratio of the content 600 so as to allow a horizontal length of the content 600 to be equal to a horizontal length of the first region 2100. Afterward, the electronic device 1000 may determine a piece of the content 600, which corresponds to a size of the first region 2100, to be the first portion 610, and may determine the second portion 620 as a piece other than the first portion 610. The electronic device 1000 may determine a size and a ratio of the correction content 630, based on a location of a user and an angle between the first region 2100 and the second region 2200, and may display the first portion 610 on the first region 2100 and display the correction content 630 on the second region 2200. As a result, even when the display 1100 is bent, the content 600 may be viewed as if the content 600 is seamlessly unfolded.

Based on at least one of a predetermined setting, a user input, or a rotation state of the electronic device 1000, the electronic device 1000 may determine whether to match a horizontal length of content with a horizontal length of the first region 2100 or to match a vertical length of the content with a vertical length of the first region 2100.

For example, referring to FIG. 6A, when a state of the electronic device 1000 is identified, in which the electronic device 1000 rotates in a vertical direction (or a state in which a hinge of the electronic device 1000 is parallel to a horizontal plane), the electronic device 1000 may display content so as to allow the vertical length of the content 600 to be equal to the vertical length of the first region 2100, based on the predetermined setting. Afterward, referring to FIG. 6B, the electronic device 1000 may receive a user input for changing a display method, and thus, may display the content so as to allow the horizontal length of the content 600 to be equal to the horizontal length of the first region 2100. However, the predetermined setting may be predefined differently from the descriptions above, and may be changed in response to a user input.

FIGS. 7A to 9B are diagrams for describing a method by which the electronic device 1000 determines the first region 2100 of the display 1100 on which a first portion of content is to be displayed, based on information about the content, according to an embodiment of the disclosure. The information about the content may include at least one of information about a type of content, information about an application that provides content, information indicating whether content and a UI to receive a user input overlay each other, or information indicating whether content include text content. However, the information about the content is not limited thereto.

Figure 7A:
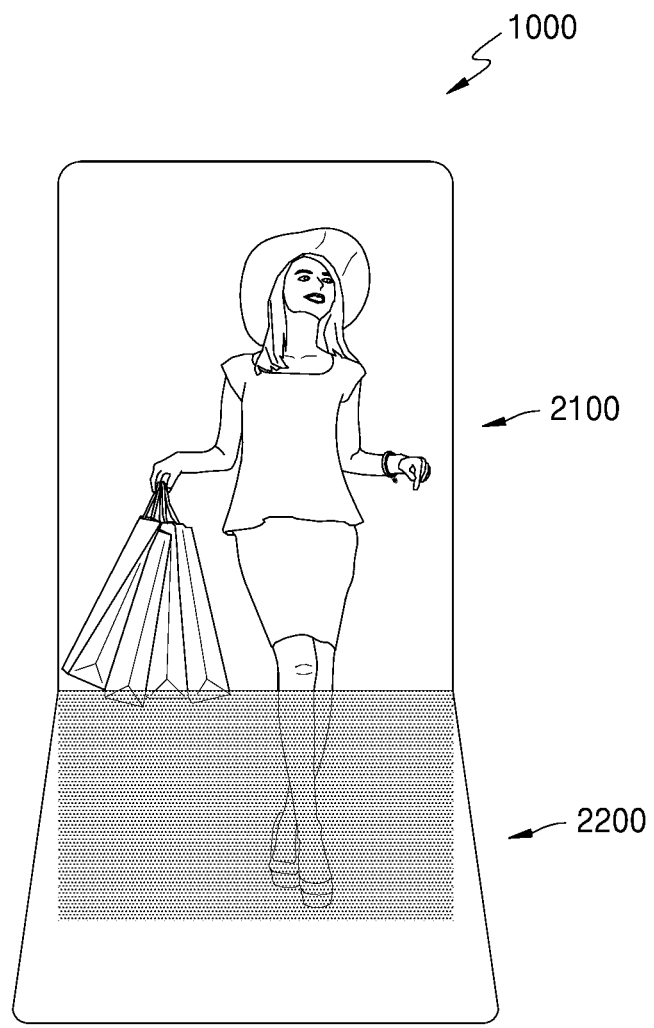
FIG. 7A is a diagram for describing a method by which the electronic device determines a first region of the display on which a first portion of content is to be displayed, based on information about a type of the content, according to an embodiment of the disclosure.
Figure 7B:
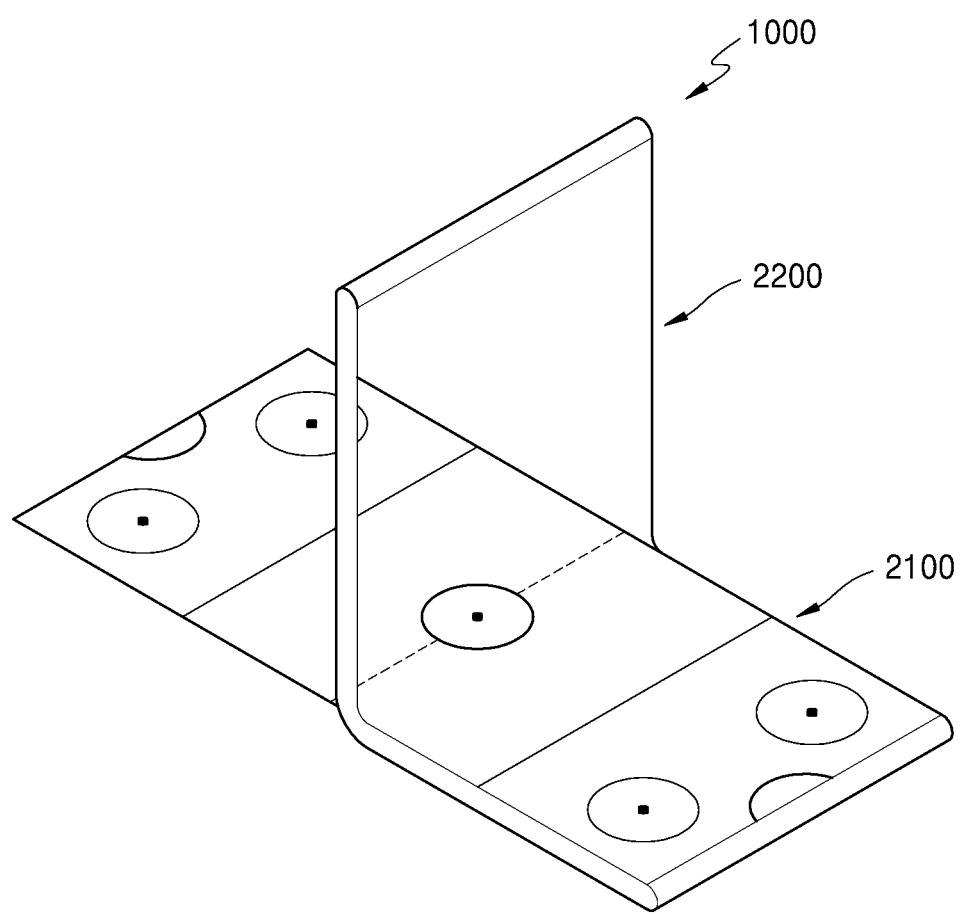
FIG. 7B is a diagram for describing a method by which the electronic device determines a first region of the display on which a first portion of content is to be displayed, based on information about a type of the content, according to an embodiment of the disclosure.

FIGS. 7A and 7B are diagrams for describing a method by which the electronic device 1000 determines the first region 2100 of the display 1100 on which a first portion of content is to be displayed, based on the information about a type of the content, according to an embodiment of the disclosure. A content type may include, but is not limited to, a document, a photo, a video, music, and/or a game.

Referring to FIG. 7A, the electronic device 1000 may identify content as a photo, and may determine, based on the identification, an upper region of the display 1100 to be the first region 2100 on which a first portion of the content is to be displayed.

Referring to FIG. 7B, the electronic device 1000 may identify content as a game, and may determine, based on the identification, a lower region of the display 1100 to be the first region 2100 on which a first portion of the content is to be displayed.

However, which region is determined to be the first region 2100 depending on each designated type of content may be predefined differently from the descriptions above, and may be changed in response to a user input. For example, it may be predefined such that, when content is a photo, the electronic device 1000 may determine a lower region of the display 1100 to be the first region 2100. Alternatively, for example, it may be predefined such that, when content is a game, the electronic device 1000 may determine a lower region of the display 1100 to be the first region 2100, but, in response to a user input, the electronic device 1000 may be changed to determine an upper region of the display 1100 to be the first region 2100.

Figure 8A:
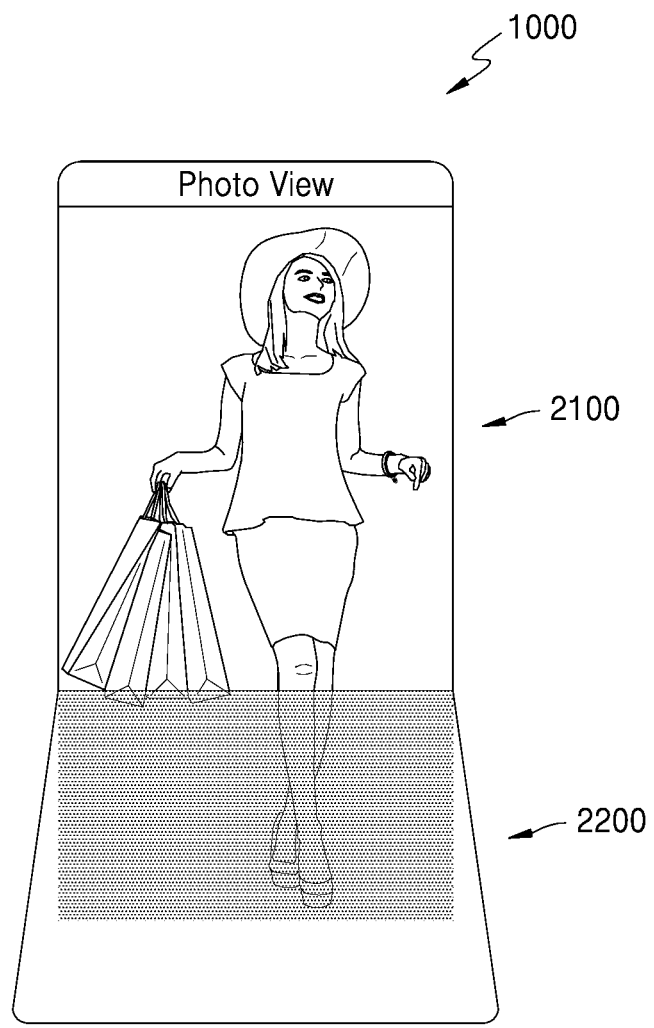
FIG. 8A is a diagram for describing a method by which the electronic device determines a first region of the display on which a first portion of content is to be displayed, based on information about an application that provides content, according to an embodiment of the disclosure.
Figure 8B:
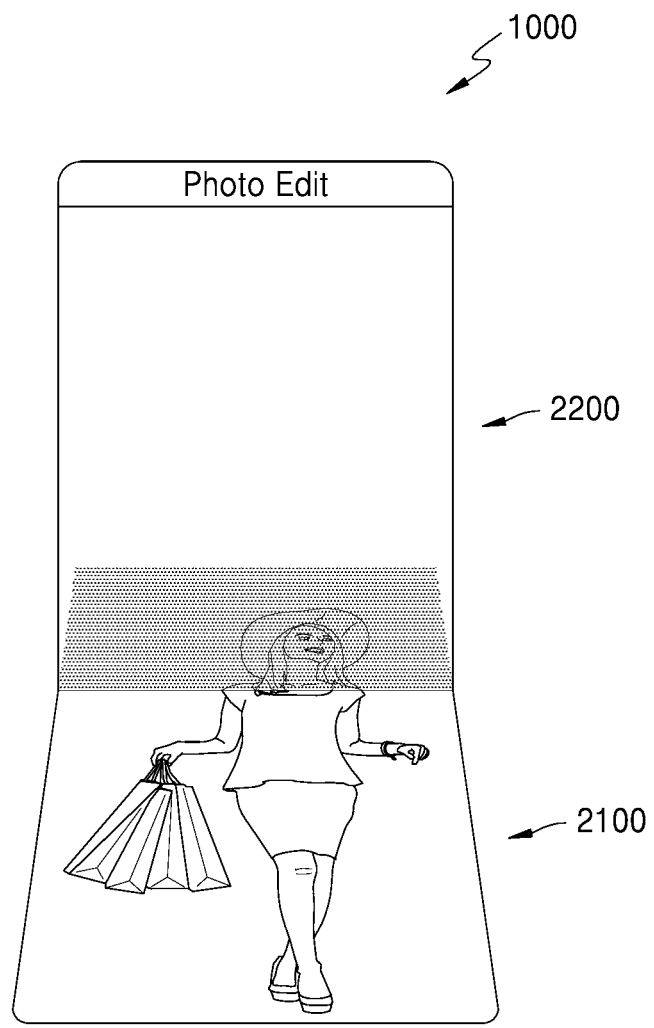
FIG. 8B is a diagram for describing a method by which the electronic device determines a first region of the display on which a first portion of content is to be displayed, based on information about an application that provides content, according to an embodiment of the disclosure.

FIGS. 8A and 8B are diagrams for describing a method by which the electronic device 1000 determines the first region 2100 of the display 1100 on which a first portion of content is to be displayed, based on information about an application that provides the content, according to an embodiment of the disclosure.

Referring to FIG. 8A, based on information about a photo providing application, the electronic device 1000 may determine an upper region of the display 1100 to be the first region 2100 on which a first portion of content is to be displayed. For example, the electronic device 1000 may identify that the photo providing application is an application for viewing photos or may identify that a photo view mode is activated from among certain modes of the photo providing application, and may determine, based on the identification, the upper region of the display 1100 to be the first region 2100.

Referring to FIG. 8B, based on the information about the photo providing application, the electronic device 1000 may determine a lower region of the display 1100 to be the first region 2100 on which the first portion of the content is to be displayed. For example, the electronic device 1000 may identify that the photo providing application is an application for editing photos or may identify that a photo edit mode is activated from among certain modes of the photo providing application, and may determine, based on the identification, the lower region of the display 1100 to be the first region 2100.

However, which region is determined to be the first region 2100 depending on each type of a content providing application or each mode of the application may be predefined differently from the descriptions above, and may be changed in response to a user input.

Figure 9A:
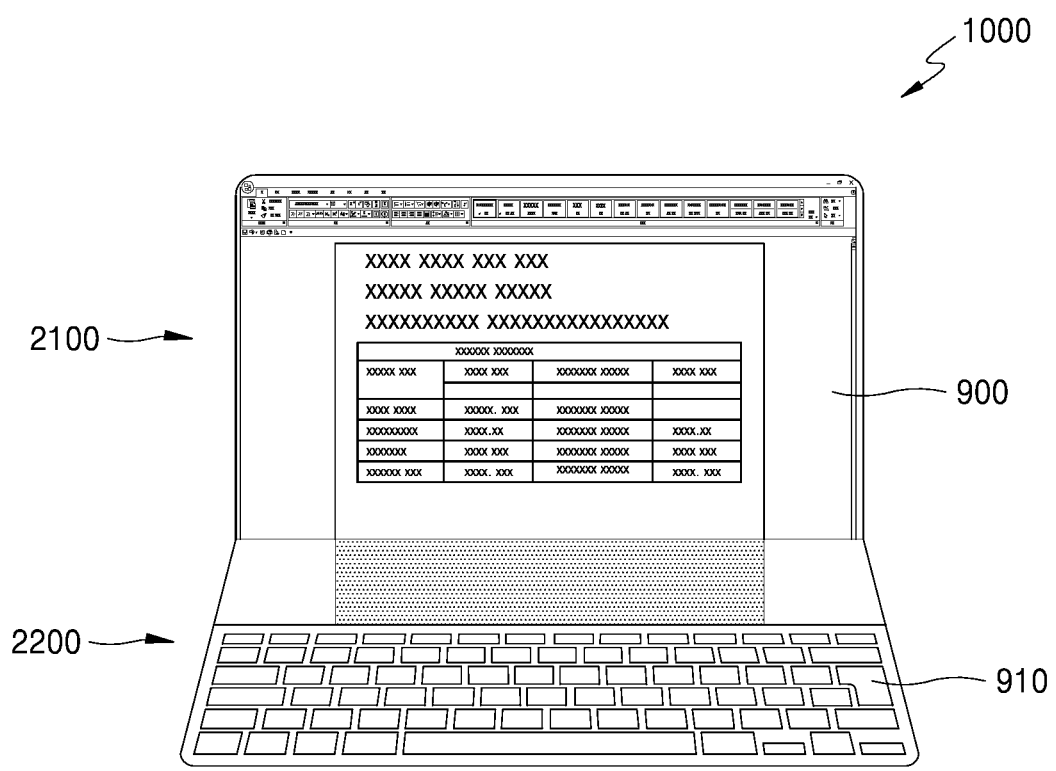
FIG. 9A is a diagram for describing a method by which the electronic device determines a first region of the display on which a first portion of content is to be displayed, based on information indicating whether content and a user interface (UI) to receive a user input overlay each other, according to an embodiment of the disclosure.
Figure 9B:
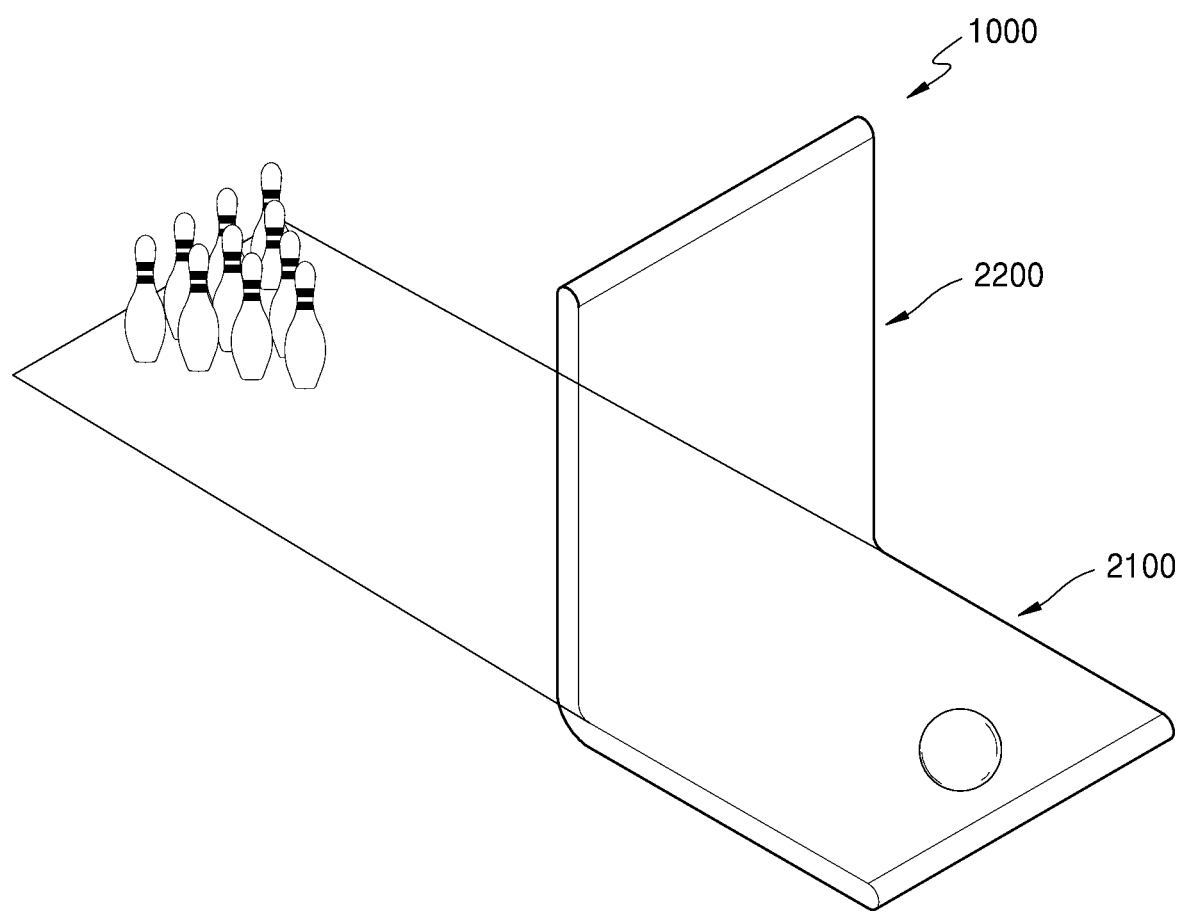
FIG. 9B is a diagram for describing a method by which the electronic device determines a first region of the display on which a first portion of content is to be displayed, based on information indicating whether content and a user interface (UI) to receive a user input overlay each other, according to an embodiment of the disclosure.

FIGS. 9A and 9B are diagrams for describing a method by which the electronic device 1000 determines the first region 2100 of the display 1100 on which a first portion of content is to be displayed, based on the information indicating whether content and a UI to receive a user input overlay each other, according to an embodiment of the disclosure.

Referring to FIG. 9A, the electronic device 1000 may identify that the content and the UI to receive a user input do not overlay each other, and may determine, based on the identification, an upper region of the display 1100 to be the first region 2100 on which a first portion of the content is to be displayed. For example, the electronic device 1000 may identify that a content providing application is a word processor application, and may identify that content 900 (e.g., a document) and a UI 910 (e.g., a keyboard) to receive a user input do not overlay each other. The electronic device 1000 may determine, based on the identification, the upper region of the display 1100 to be the first region 2100.

Referring to FIG. 9B, the electronic device 1000 may identify that the content and the UI to receive a user input overlay each other, and may determine, based on the identification, a lower region of the display 1100 to be the first region 2100 on which a first portion of the content is to be displayed. For example, the electronic device 1000 may identify that the content is a bowling game, and may identify that the UI to receive a user input and a bowling ball of the content overlay each other. The electronic device 1000 may determine, based on the identification, the lower region of the display 1100 to be the first region 2100.

FIGS. 7A to 9B illustrate the methods of determining the first region 2100 based on the information about a type of the content, the information about an application that provides content, or the information indicating whether content and a UI to receive a user input overlay each other, but the electronic device 1000 may determine the first region 2100, based on different information about the content. For example, the electronic device 1000 may determine the first region 2100, based on the information indicating whether content include text content.

Priorities may exist in references for determining the first region 2100 of the display 1100 on which a first portion of content is to be displayed. According to an embodiment of the disclosure, when the first region 2100 determined based on the references varies (i.e., when the references conflict), the electronic device 1000 may determine the first region 2100, based on the priorities.

For example, a case in which the electronic device 1000 executes a photo editing application may be assumed. The electronic device 1000 may determine an upper region of the display 1100 to be the first region 2100, based on the information about a type of the content. Also, the electronic device 1000 may determine a lower region of the display 1100 to be the first region 2100, based on the information about an application that provides content. As such, when the first regions 2100 determined based on respective references are different, the electronic device 1000 may determine the first region 2100, based on priorities. For example, when the information about an application that provides the content has a higher priority than the information about a type of the content, the electronic device 1000 may determine the lower region of the display 1100 to be the first region 2100, based on the information about an application that provides content. However, the priorities in the references for determining the first region 2100 may be predefined differently from the descriptions above, and may be changed in response to a user input.

Figure 10A:
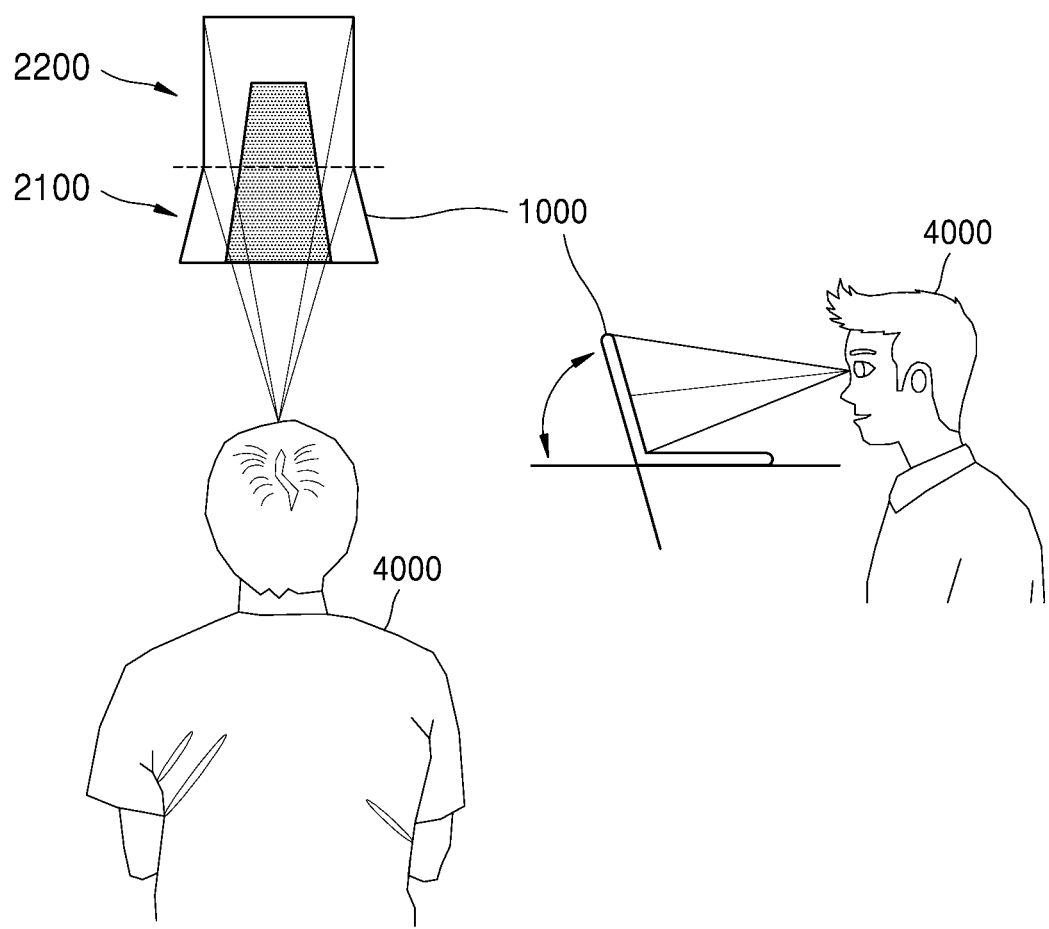
FIG. 10A is a diagram for describing a method by which the electronic device generates an image, based on a location of a user and an angle between a first region and a second region of the display, the location and the angle being obtained by the electronic device, according to an embodiment of the disclosure.
Figure 10B:
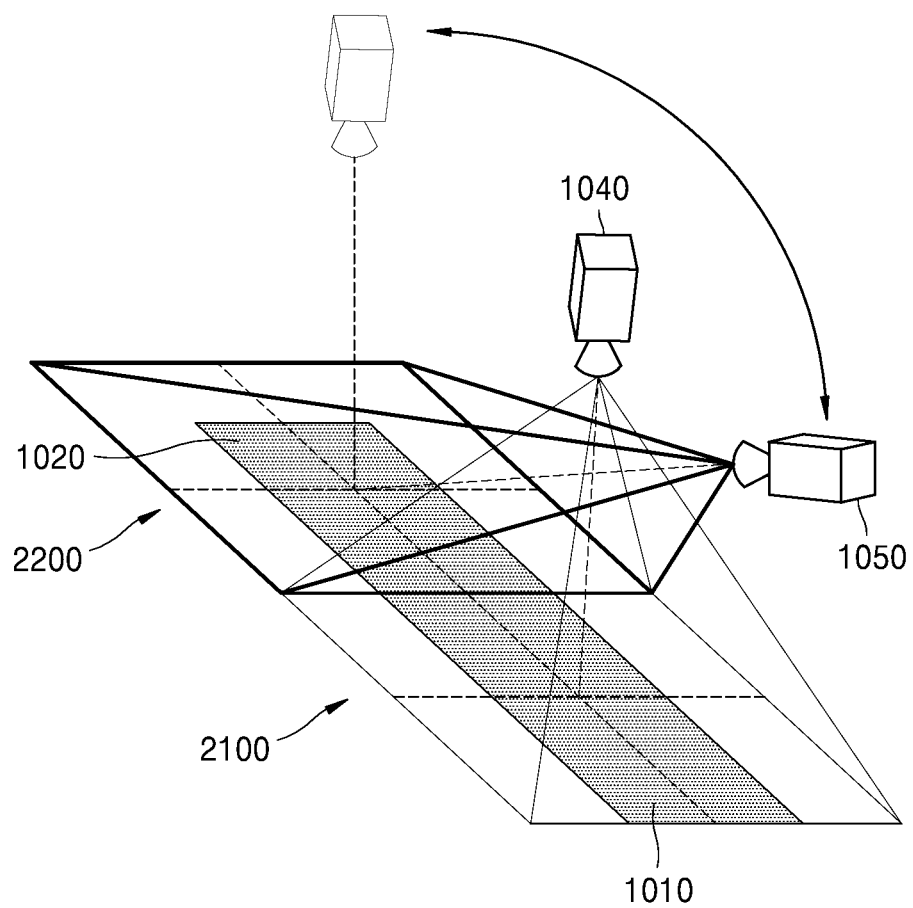
FIG. 10B is a diagram for describing a method by which the electronic device generates an image, based on a location of a user and an angle between a first region and a second region of the display, the location and the angle being obtained by the electronic device, according to an embodiment of the disclosure.
Figure 10C:
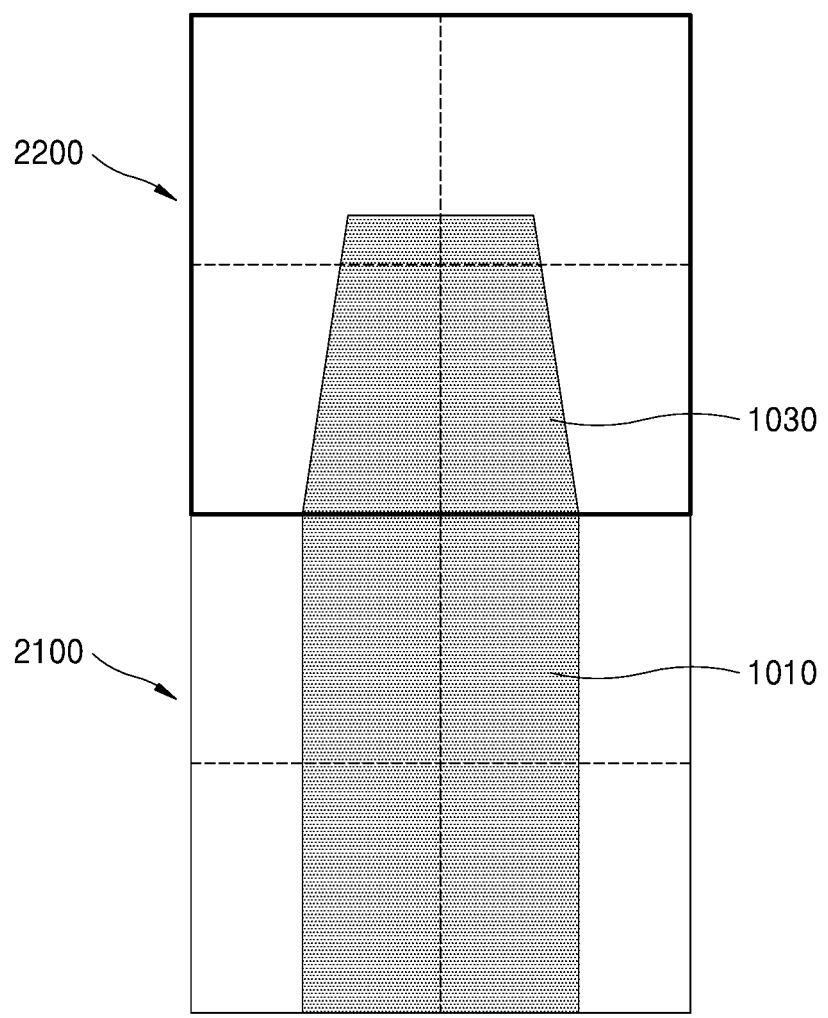
FIG. 10C is a diagram for describing a method by which the electronic device generates an image, based on a location of a user and an angle between a first region and a second region of the display, the location and the angle being obtained by the electronic device, according to an embodiment of the disclosure.

FIGS. 10A and 10C are diagrams for describing a method by which the electronic device 1000 generates correction content, based on a location of a user and an angle between the first region 2100 and the second region 2200 of the display 1100, the location and the angle being obtained by the electronic device 1000, according to an embodiment of the disclosure.

Referring to FIG. 10A, according to an embodiment of the disclosure, the display 1100 of the electronic device 1000 may include the first region 2100 and the second region 2200. Also, according to an embodiment of the disclosure, the electronic device 1000 may determine a lower region of the display 1100 to be the first region 2100 on which a first portion of content is to be displayed.

According to an embodiment of the disclosure, the electronic device 1000 may obtain an angle between the first region 2100 and the second region 2200 of the display 1100 and a location of a user 4000. For example, when the user 4000 is located in front of the electronic device 1000, the location of the user 4000 may include a distance between the second region 2200 of the display 1100 and the user 4000 and a vertical angle between the second region 2200 of the display 1100 and the user 4000. When the lower region of the display 1100 is determined to be the first region 2100, the distance between the second region 2200 and the user 4000 may correspond to a distance between an upper region of the display 1100 and the user 4000, and the vertical angle between the second region 2200 and the user 4000 may correspond to a vertical angle between the upper region of the display 1100 and the user 4000.

Referring to FIG. 10B, the electronic device 1000 may determine a location of a first virtual camera 1040 corresponding to a first portion 1010 of content and a location of a second virtual camera 1050 corresponding to a second portion 1020 of the content. According to an embodiment of the disclosure, the location of the first virtual camera 1040 may be stationary, and the location of the second virtual camera 1050 may be changed based on the angle between the first region 2100 and the second region 2200 of the display 1100 and the location of the user 4000. For example, when the user 4000 is located in front of the electronic device 1000, the second virtual camera 1050 may vertically move by an angle corresponding to a sum of the angle between the first region 2100 and the second region 2200 and a vertical angle between the second region 2200 of the display 1100 and the user 4000.

Referring to FIG. 10C, the electronic device 1000 may determine a size and a ratio of correction content 1030 corresponding to the second portion 1020 of the content, based on the location of the second virtual camera 1050. Also, the electronic device 1000 may display the first portion 1010 of the content on the first region 2100 of the display 1100, and may display the correction content 1030 on the second region 2200 of the display 1100.

Figure 11A:
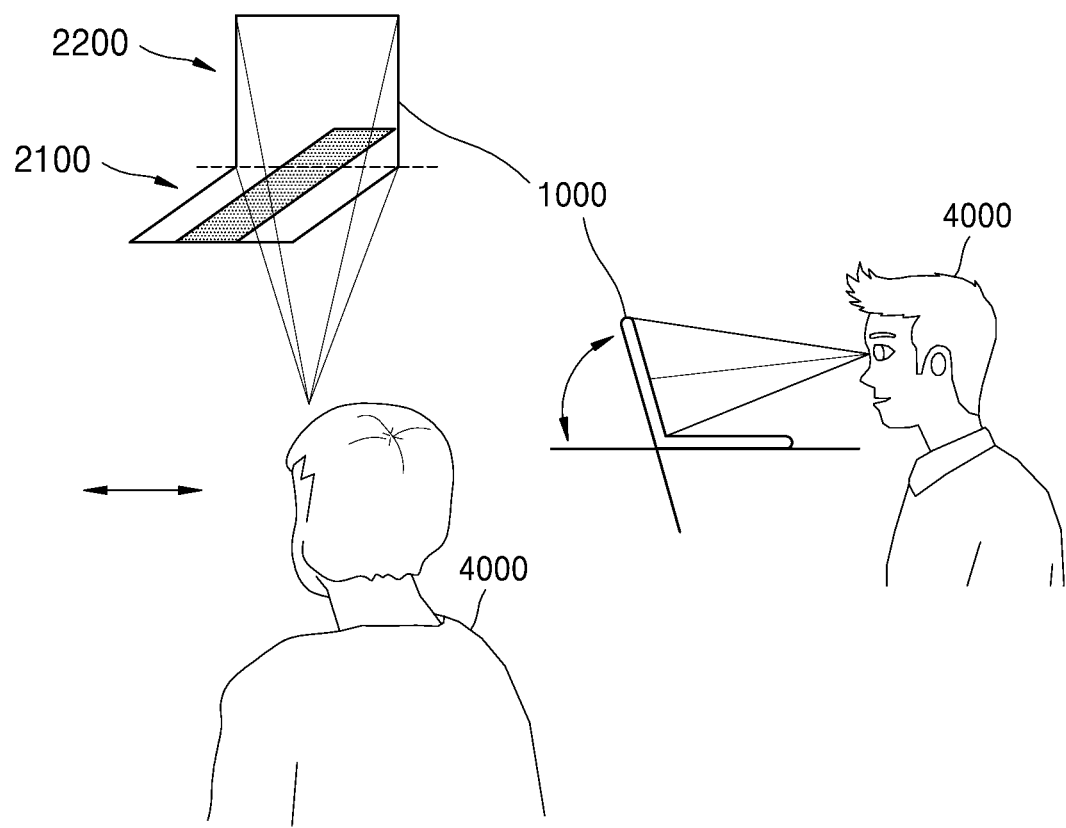
FIG. 11A is a diagram for describing a method by which the electronic device generates an image, based on a location of a user and an angle between a first region and a second region of the display, the location and the angle being obtained by the electronic device, according to an embodiment of the disclosure.
Figure 11B:
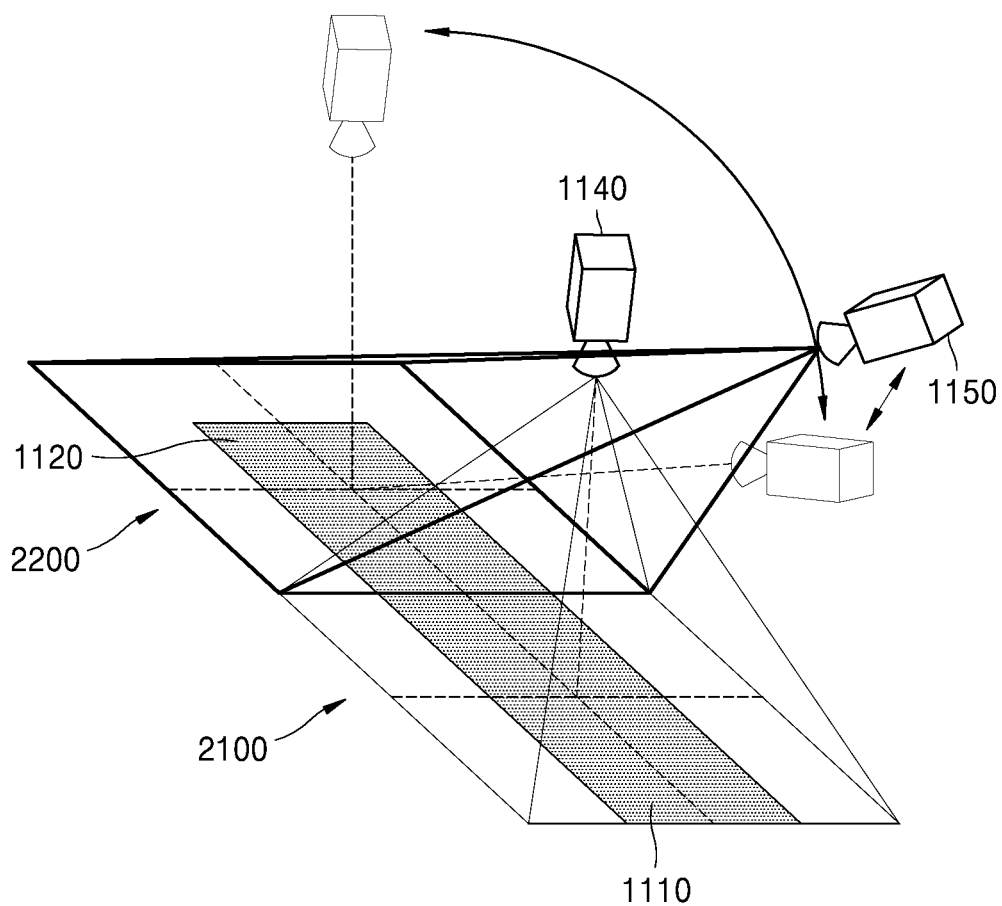
FIG. 11B is a diagram for describing a method by which the electronic device generates an image, based on a location of a user and an angle between a first region and a second region of the display, the location and the angle being obtained by the electronic device, according to an embodiment of the disclosure.
Figure 11C:
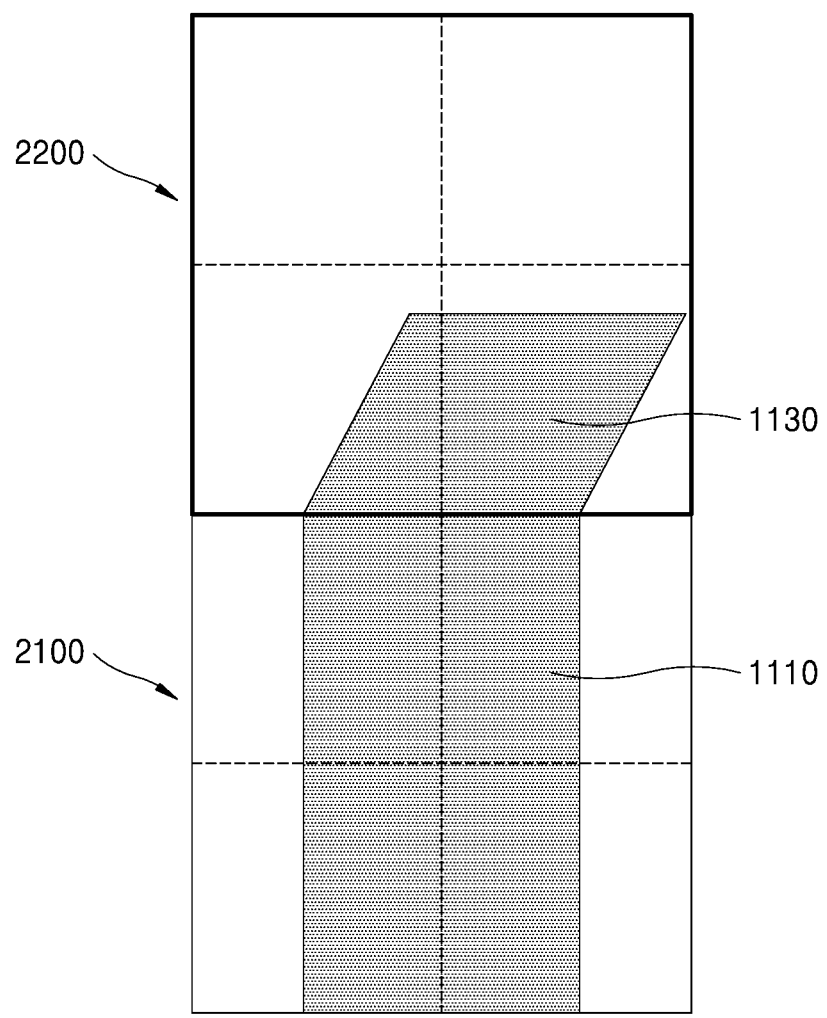
FIG. 11C is a diagram for describing a method by which the electronic device generates an image, based on a location of a user and an angle between a first region and a second region of the display, the location and the angle being obtained by the electronic device, according to an embodiment of the disclosure.

FIGS. 11A to 11C are diagrams for describing a method by which the electronic device 1000 generates correction content, based on a location of a user and an angle between the first region 2100 and the second region 2200 of the display 1100, the location and the angle being obtained by the electronic device 1000, according to an embodiment of the disclosure.

Referring to FIG. 11A, according to an embodiment of the disclosure, the display 1100 of the electronic device 1000 may include the first region 2100 and the second region 2200. Also, according to an embodiment of the disclosure, the electronic device 1000 may determine a lower region of the display 1100 to be the first region 2100 on which a first portion of content is to be displayed.

According to an embodiment of the disclosure, the electronic device 1000 may obtain an angle between the first region 2100 and the second region 2200 of the display 1100 and a location of the user 4000. For example, when the user 4000 moves and is located in a place distant from the front of the electronic device 1000 in a horizontal direction, the location of the user 4000 may include a distance between the second region 2200 of the display 1100 and the user 4000 and vertical and horizontal angles between the second region 2200 of the display 1100 and the user 4000. When the lower region of the display 1100 is determined to be the first region 2100, the distance between the second region 2200 and the user 4000 may correspond to a distance between an upper region of the display 1100 and the user 4000, and the vertical and horizontal angles between the second region 2200 and the user 4000 may correspond to vertical and horizontal angles between the upper region of the display 1100 and the user 4000.

Referring to FIG. 11B, the electronic device 1000 may determine a location of a first virtual camera 1140 corresponding to a first portion 1110 of content and a location of a second virtual camera 1150 corresponding to a second portion 1120 of the content. According to an embodiment of the disclosure, the location of the first virtual camera 1140 may be stationary, and the location of the second virtual camera 1150 may be changed based on the angle between the first region 2100 and the second region 2200 of the display 1100 and the location of the user 4000. For example, when the user 4000 moves and is located in a place distant from the front of the electronic device 1000 in a horizontal direction, the second virtual camera 1150 may move in a vertical direction by an angle corresponding to a sum of the angle between the first region 2100 and the second region 2200 and a vertical angle between the second region 2200 of the display 1100 and the user 4000, and may move in a horizontal direction by an angle corresponding to a horizontal angle between the second region 2200 of the display 1100 and the user 4000.

Referring to FIG. 11C, the electronic device 1000 may determine a size and a ratio of correction content 1130 corresponding to the second portion 1120 of the content, based on the location of the second virtual camera 1150. Also, the electronic device 1000 may display the first portion 1110 of the content on the first region 2100 of the display 1100, and may display the correction content 1130 on the second region 2200 of the display 1100.

Figure 12A:
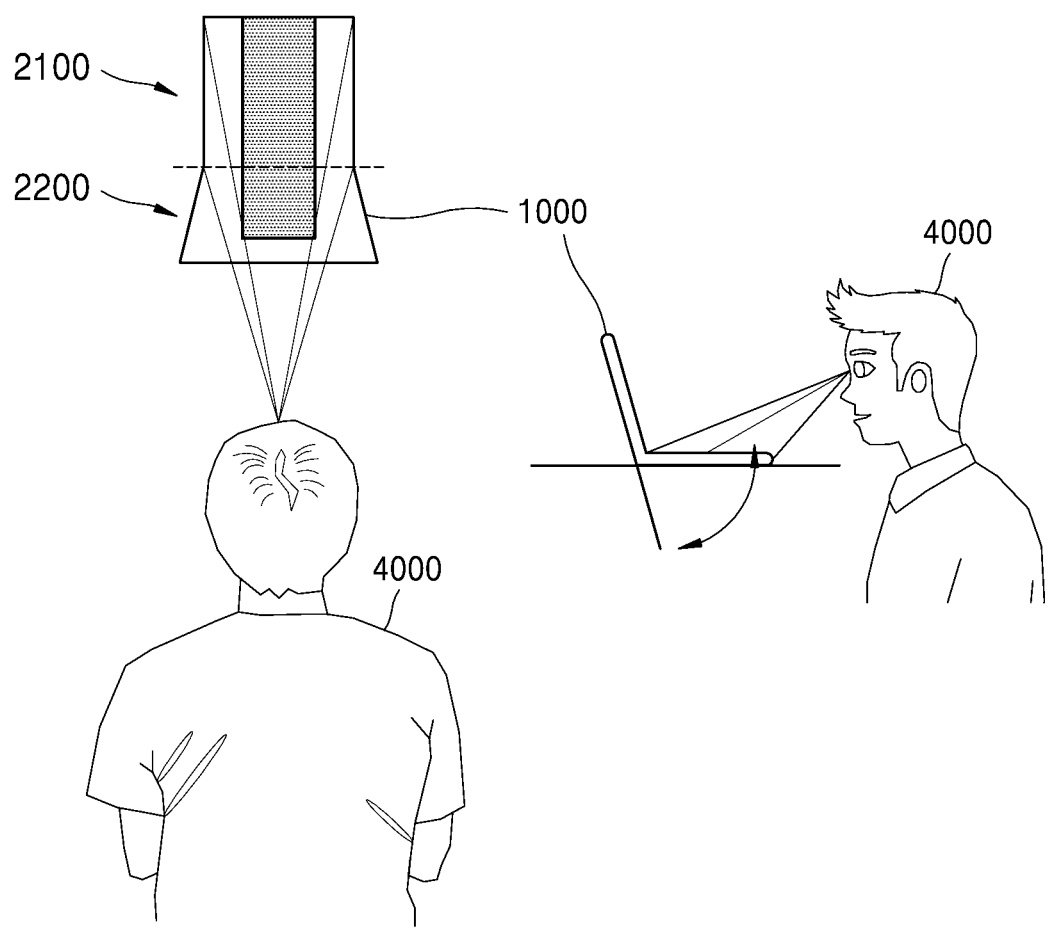
FIG. 12A is a diagram for describing a method by which the electronic device generates an image, based on a location of a user and an angle between a first region and a second region of the display, the location and the angle being obtained by the electronic device, according to an embodiment of the disclosure.
Figure 12B:
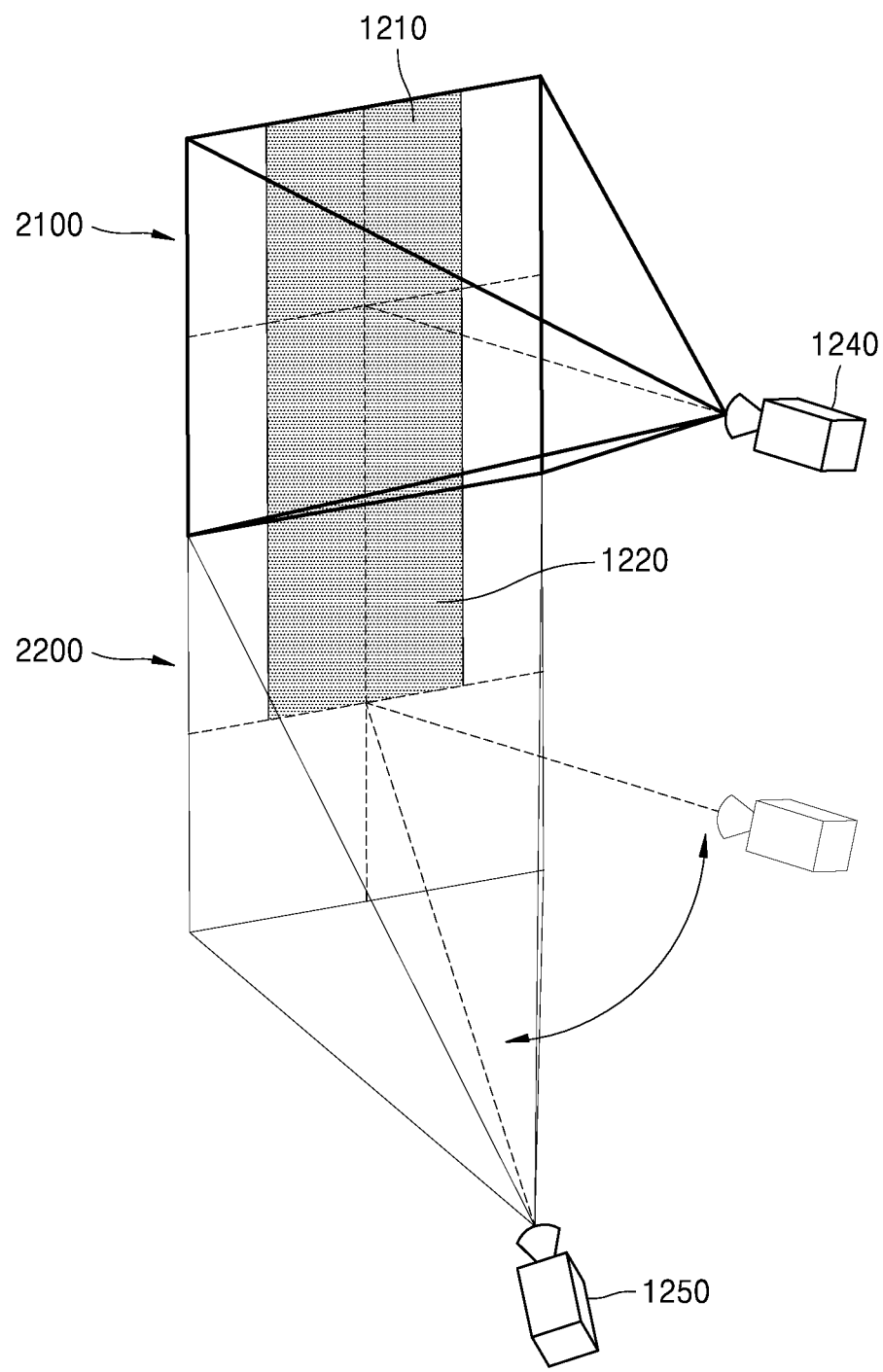
FIG. 12B is a diagram for describing a method by which the electronic device generates an image, based on a location of a user and an angle between a first region and a second region of the display, the location and the angle being obtained by the electronic device, according to an embodiment of the disclosure.
Figure 12C:
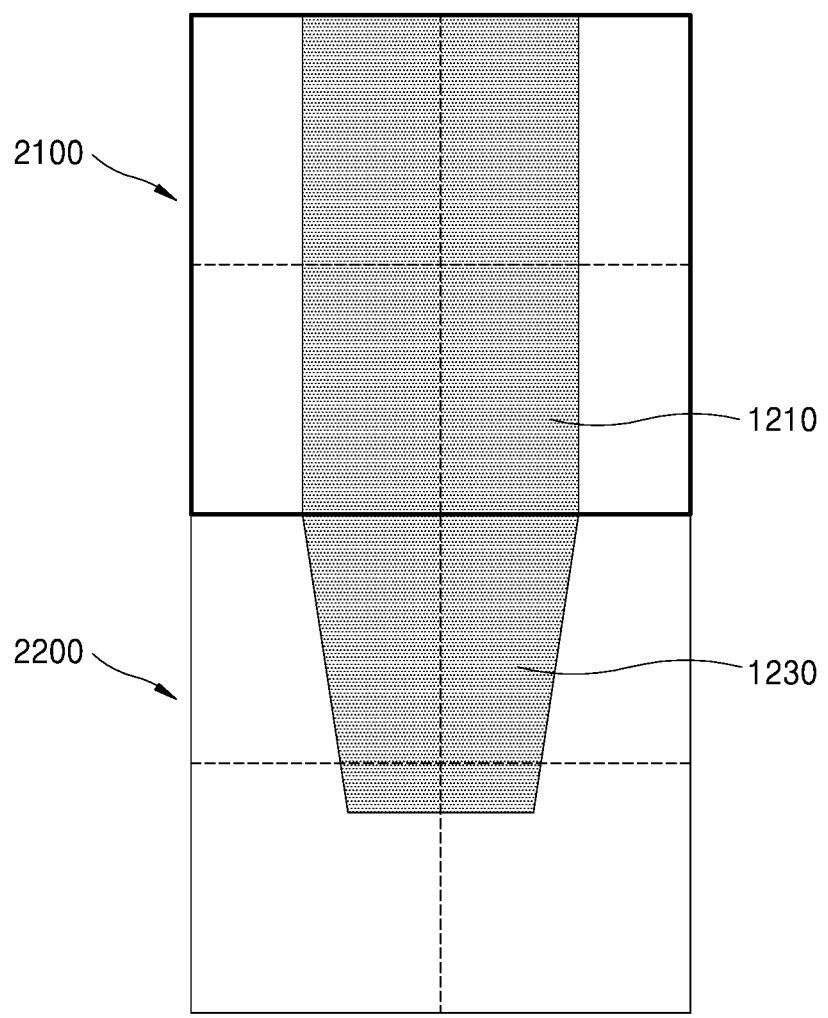
FIG. 12C is a diagram for describing a method by which the electronic device generates an image, based on a location of a user and an angle between a first region and a second region of the display, the location and the angle being obtained by the electronic device, according to an embodiment of the disclosure.

FIGS. 12A to 12C are diagrams for describing a method by which the electronic device 1000 generates correction content, based on a location of a user and an angle between the first region 2100 and the second region 2200 of the display 1100, the location and the angle being obtained by the electronic device 1000, according to an embodiment of the disclosure.

Referring to FIG. 12A, according to an embodiment of the disclosure, the display 1100 of the electronic device 1000 may include the first region 2100 and the second region 2200. Also, according to an embodiment of the disclosure, the electronic device 1000 may determine an upper region of the display 1100 to be the first region 2100 on which a first portion of content is to be displayed.

According to an embodiment of the disclosure, the electronic device 1000 may obtain an angle between the first region 2100 and the second region 2200 of the display 1100 and a location of the user 4000. For example, when the user 4000 is located in front of the electronic device 1000, the location of the user 4000 may include a distance between the second region 2200 of the display 1100 and the user 4000 and a vertical angle between the second region 2200 of the display 1100 and the user 4000. When the upper region of the display 1100 is determined to be the first region 2100, the distance between the second region 2200 and the user 4000 may correspond to a distance between a lower region of the display 1100 and the user 4000, and the vertical angle between the second region 2200 and the user 4000 may correspond to a vertical angle between the lower region of the display 1100 and the user 4000.

Referring to FIG. 12B, the electronic device 1000 may determine a location of a first virtual camera 1240 corresponding to a first portion 1210 of content and a location of a second virtual camera 1250 corresponding to a second portion 1220 of the content. According to an embodiment of the disclosure, the location of the first virtual camera 1240 may be stationary, and the location of the second virtual camera 1250 may be changed based on the angle between the first region 2100 and the second region 2200 of the display 1100 and the location of the user 4000. For example, when the user 4000 is located in front of the electronic device 1000, the second virtual camera 1250 may vertically move by an angle corresponding to a sum of the angle between the first region 2100 and the second region 2200 and a vertical angle between the second region 2200 of the display 1100 and the user 4000.

Referring to FIG. 12C, the electronic device 1000 may determine a size and a ratio of correction content 1230 corresponding to the second portion 1220 of the content, based on the location of the second virtual camera 1250. Also, the electronic device 1000 may display the first portion 1210 of the content on the first region 2100 of the display 1100, and may display the correction content 1230 on the second region 2200 of the display 1100.

Figure 13A:
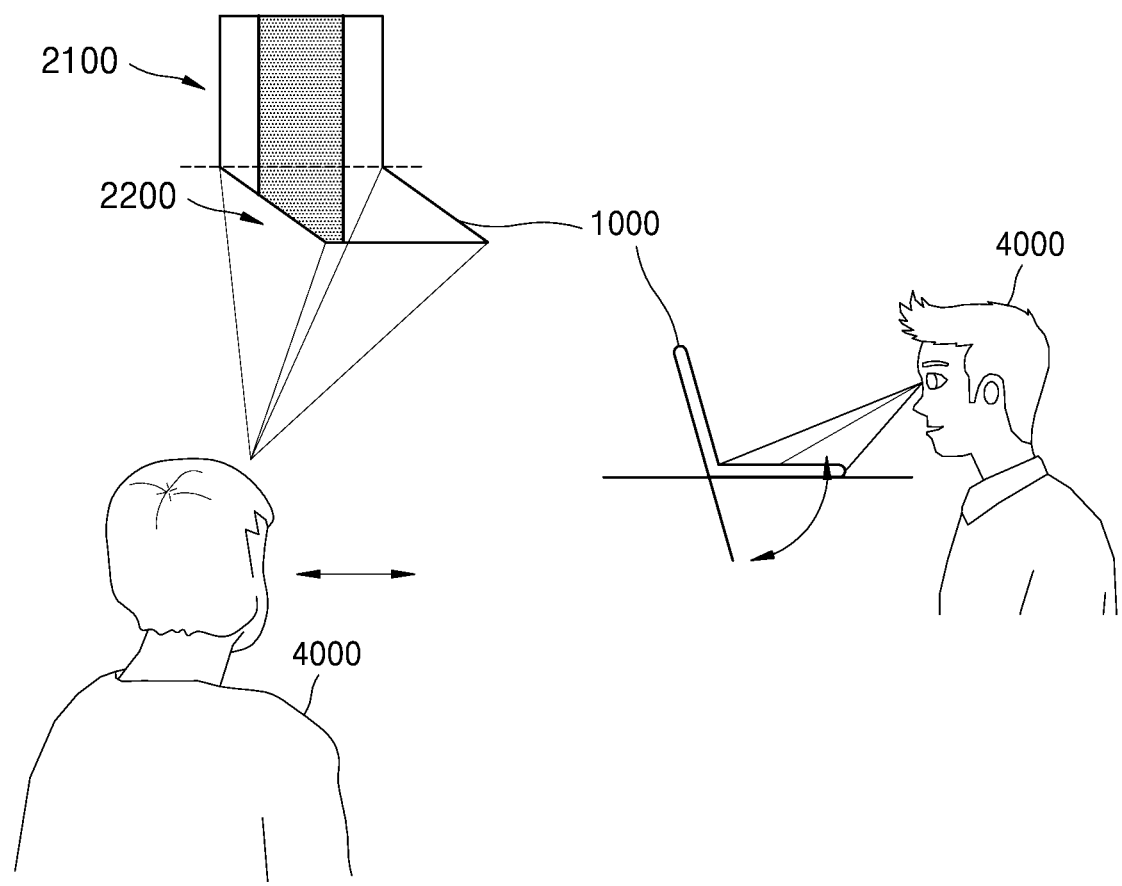
FIG. 13A is a diagram for describing a method by which the electronic device generates an image, based on a location of a user and an angle between a first region and a second region of the display, the location and the angle being obtained by the electronic device, according to an embodiment of the disclosure.
Figure 13B:
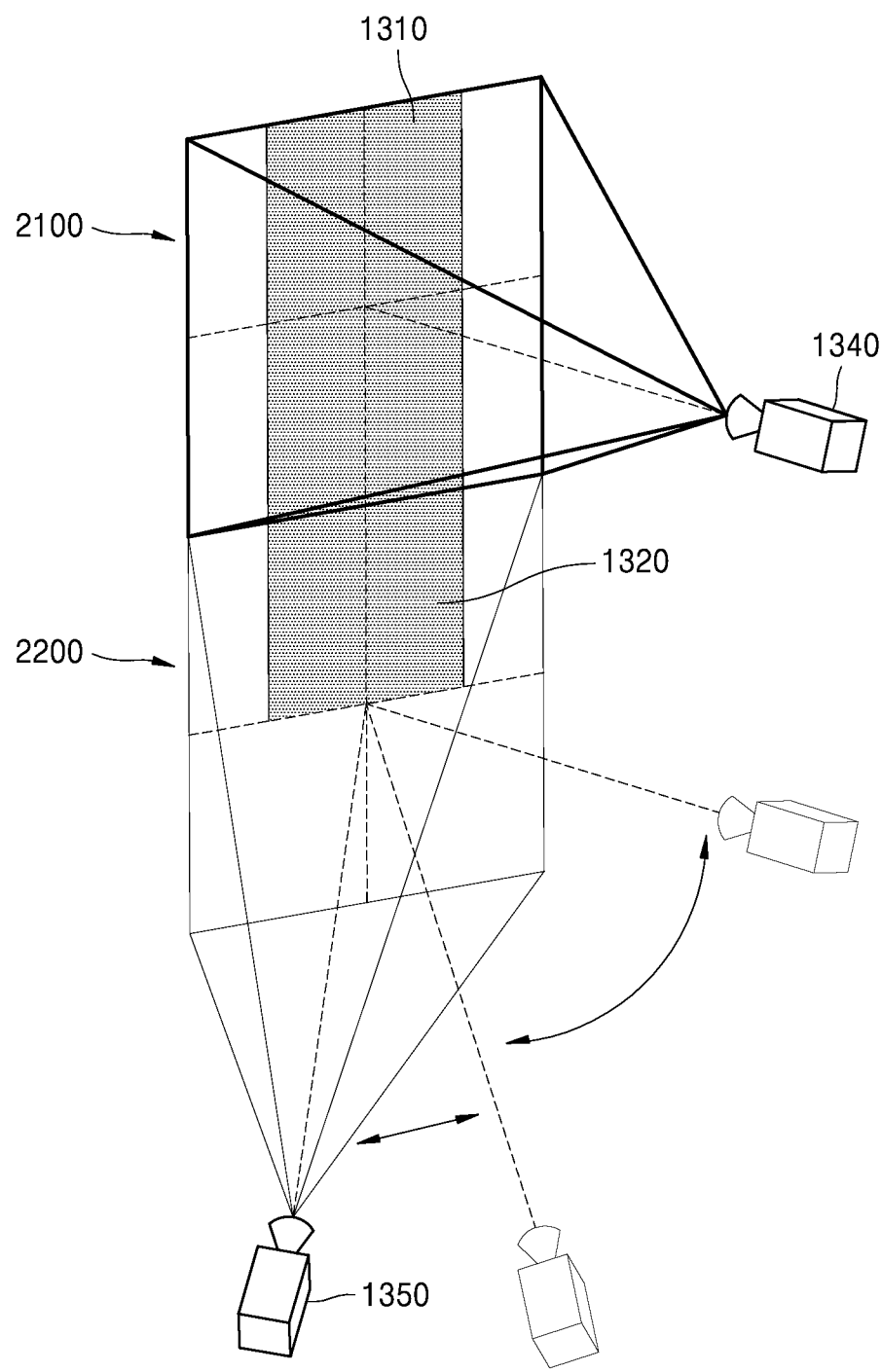
FIG. 13B is a diagram for describing a method by which the electronic device generates an image, based on a location of a user and an angle between a first region and a second region of the display, the location and the angle being obtained by the electronic device, according to an embodiment of the disclosure.
Figure 13C:
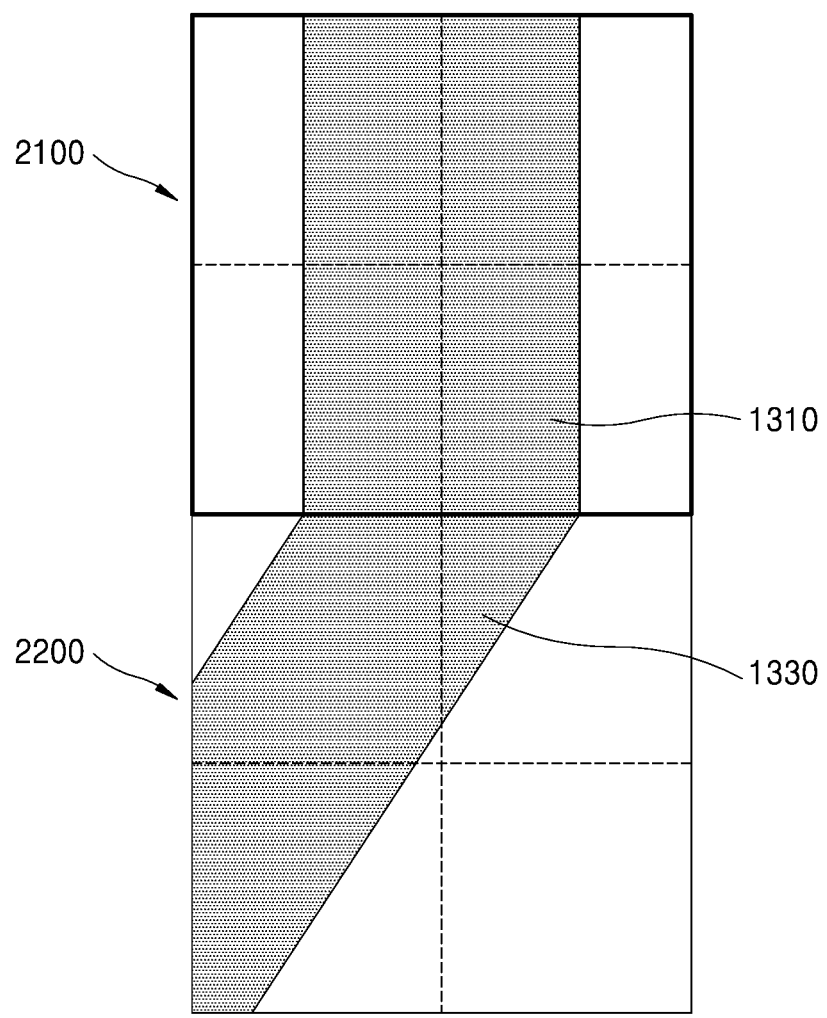
FIG. 13C is a diagram for describing a method by which the electronic device generates an image, based on a location of a user and an angle between a first region and a second region of the display, the location and the angle being obtained by the electronic device, according to an embodiment of the disclosure.

FIGS. 13A to 13C are diagrams for describing a method by which the electronic device 1000 generates correction content, based on a location of a user and an angle between the first region 2100 and the second region 2200 of the display 1100, the location and the angle being obtained by the electronic device 1000, according to an embodiment of the disclosure.

Referring to FIG. 13A, according to an embodiment of the disclosure, the display 1100 of the electronic device 1000 may include the first region 2100 and the second region 2200. Also, according to an embodiment of the disclosure, the electronic device 1000 may determine an upper region of the display 1100 to be the first region 2100 on which a first portion of content is to be displayed.

According to an embodiment of the disclosure, the electronic device 1000 may obtain an angle between the first region 2100 and the second region 2200 of the display 1100 and a location of the user 4000. For example, when the user 4000 moves and is located in a place distant from the front of the electronic device 1000 in a horizontal direction, the location of the user 4000 may include a distance between the second region 2200 of the display 1100 and the user 4000 and vertical and horizontal angles between the second region 2200 of the display 1100 and the user 4000. When the upper region of the display 1100 is determined to be the first region 2100, the distance between the second region 2200 and the user 4000 may correspond to a distance between a lower region of the display 1100 and the user 4000, and vertical and horizontal angles between the second region 2200 and the user 4000 may correspond to vertical and horizontal angles between the lower region of the display 1100 and the user 4000.

Referring to FIG. 13B, the electronic device 1000 may determine a location of a first virtual camera 1340 corresponding to a first portion 1310 of content and a location of a second virtual camera 1350 corresponding to a second portion 1320 of the content. According to an embodiment of the disclosure, the location of the first virtual camera 1340 may be stationary, and the location of the second virtual camera 1350 may be changed based on the angle between the first region 2100 and the second region 2200 of the display 1100 and the location of the user 4000. For example, when the user 4000 moves and is located in a place distant from the front of the electronic device 1000 in a horizontal direction, the second virtual camera 1350 may move in a vertical direction by an angle corresponding to a sum of the angle between the first region 2100 and the second region 2200 and a vertical angle between the second region 2200 of the display 1100 and the user 4000, and may move in a horizontal direction by an angle corresponding to a horizontal angle between the second region 2200 of the display 1100 and the user 4000.

Referring to FIG. 13C, the electronic device 1000 may determine a size and a ratio of correction content 1330 corresponding to the second portion 1320 of the content, based on the location of the second virtual camera 1350. Also, the electronic device 1000 may display the first portion 1310 of the content on the first region 2100 of the display 1100, and may display the correction content 1330 on the second region 2200 of the display 1100.

Figure 14A:
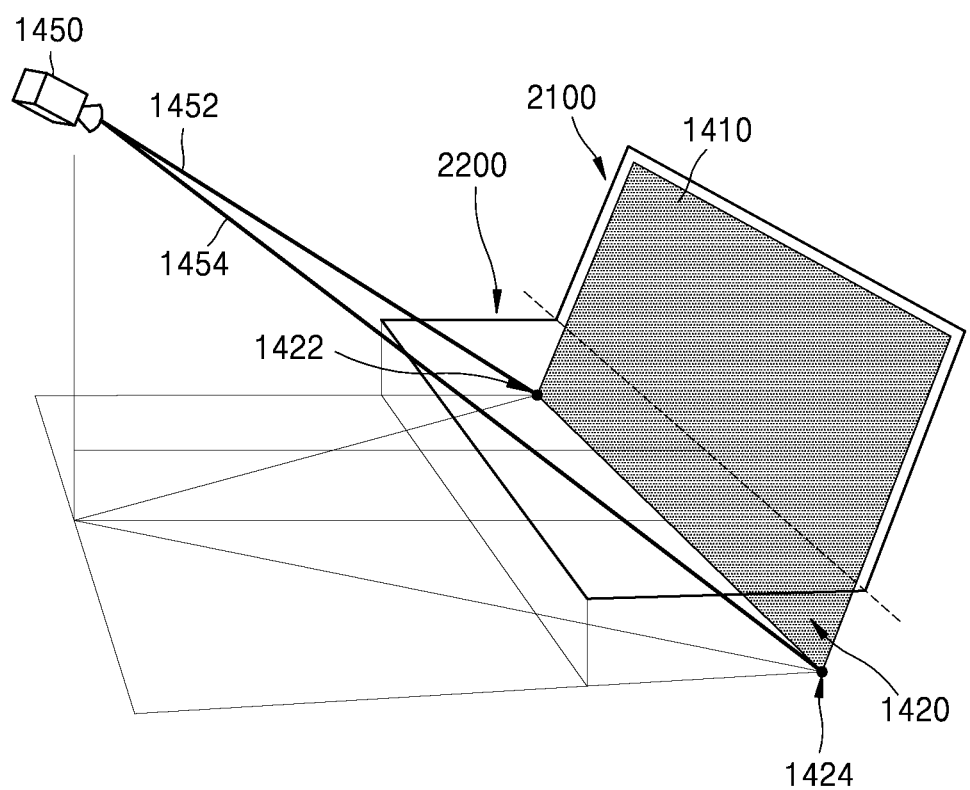
FIG. 14A is a diagram for describing a method by which the electronic device determines a size and a ratio of an image corresponding to a second portion of content, according to an embodiment of the disclosure.
Figure 14B:
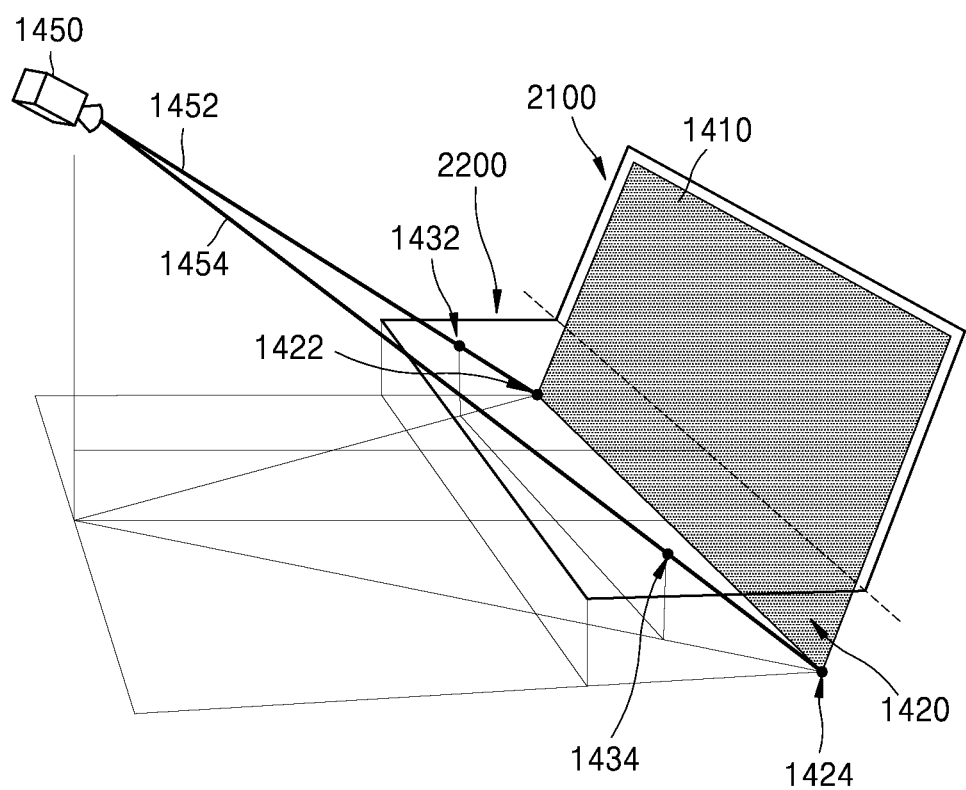
FIG. 14B is a diagram for describing a method by which the electronic device determines a size and a ratio of an image corresponding to a second portion of content, according to an embodiment of the disclosure.
Figure 14C:
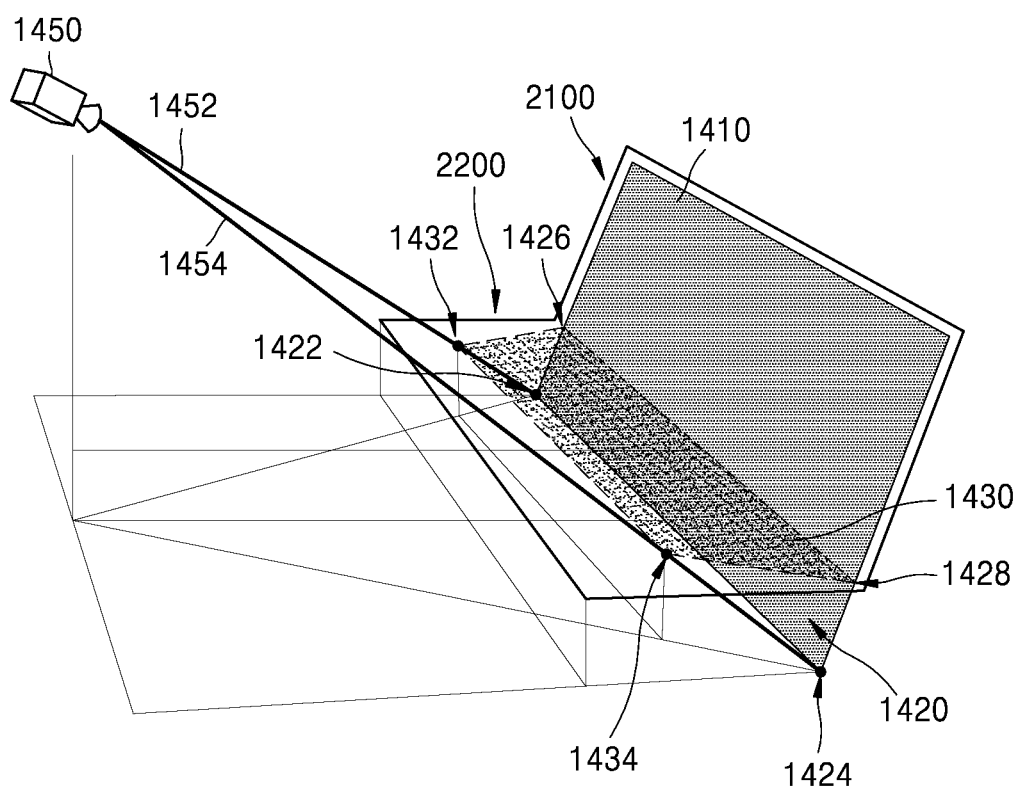
FIG. 14C is a diagram for describing a method by which the electronic device determines a size and a ratio of an image corresponding to a second portion of content, according to an embodiment of the disclosure.

FIGS. 14A to 14C are diagrams for describing a method by which the electronic device 1000 determines a size and a ratio of correction content corresponding to a second portion of content, according to an embodiment of the disclosure.

Referring to FIG. 14, according to an embodiment of the disclosure, the display 1100 may be bent to include two or more regions. Also, the electronic device 1000 may determine an upper region of the display 1100 to be the first region 2100 on which a first portion 1410 of content is to be displayed.

According to an embodiment of the disclosure, the electronic device 1000 may determine a location of a second virtual camera 1450 corresponding to a second portion 1420 of the content. As described above with reference to FIGS. 10A to 13C, the location of the second virtual camera 1450 may be changed based on an angle between the first region 2100 and the second region 2200 of the display 1100 and a location of a user.

According to an embodiment of the disclosure, the electronic device 1000 may identify virtual lines connecting the second virtual camera 1450 and both bottom corners of the second portion 1420 of the content. For example, the electronic device 1000 may identify a virtual line 1452 connecting the second virtual camera 1450 and a bottom-left corner 1422 of the second portion 1420 of the content, and may identify a virtual line 1454 connecting the second virtual camera 1450 and a bottom-right corner 1424 of the second portion 1420 of the content.

Referring to FIG. 14B, according to an embodiment of the disclosure, the electronic device 1000 may identify points where virtual lines connecting the second virtual camera 1450 and both bottom corners of the second portion 1420 of the content and the second region 2200 of the display 1100 cross. For example, the electronic device 1000 may identify a point 1432 where the virtual line 1452 and the second region 2200 of the display 1100 cross, and may identify a point 1434 where the virtual line 1454 and the second region 2200 of the display 1100 cross.

Referring to FIG. 14C, according to an embodiment of the disclosure, the electronic device 1000 may determine a size and a ratio of correction content 1430 corresponding to the second portion 1420 of the content, based on the points where the virtual lines and the second region 2200 of the display 1100 cross. For example, the electronic device 1000 may determine the size and the ratio of the correction content 1430 so as to allow both top corners 1426 and 1428 of the second portion of the content and the points 1432 and 1434 to correspond to four corners of the image 1430.

Figure 15:
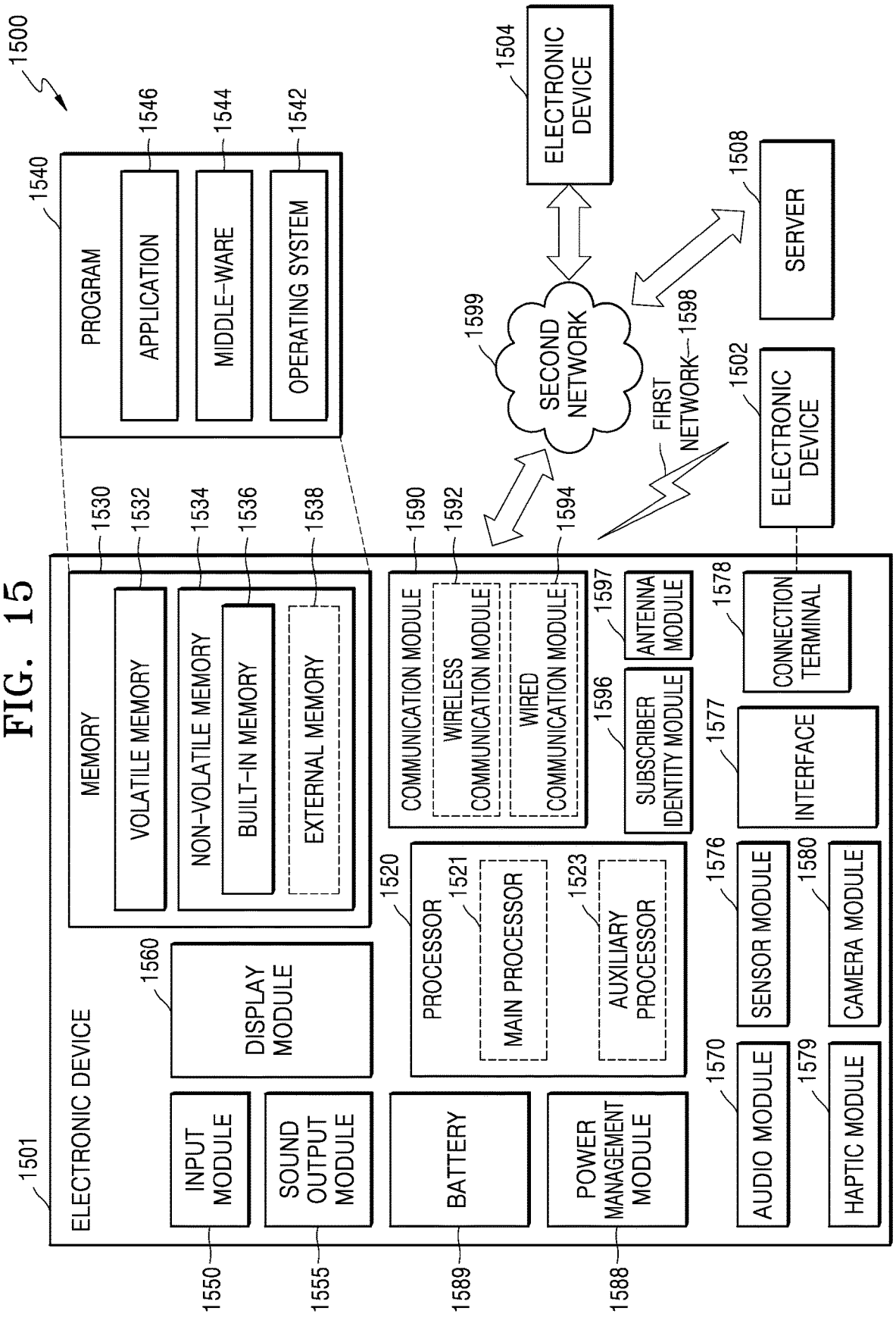
FIG. 15 is a block diagram of an electronic device in a network environment, according to an embodiment of the disclosure.

FIG. 15 is a block diagram of an electronic device 1501 in a network environment, according to an embodiment of the disclosure.

According to an embodiment of the disclosure, the electronic device 1501 of FIG. 15 may indicate the electronic device 1000 of FIG. 1. Also, a display module 1560 of FIG. 15 may indicate the display 1100 of FIG. 1, a camera module 1580 of FIG. 15 may indicate the camera 1200 of FIG. 1, and a sensor module 1576 of FIG. 15 may indicate the sensor 1300 of FIG. 1. According to an embodiment of the disclosure, a processor 1520 of FIG. 15 may indicate the processor 1400 of FIG. 1, and a memory 1530 of FIG. 15 may indicate the memory 1500 of FIG. 1.

Referring to FIG. 15, the electronic device 1501 in the network environment may communicate with an electronic device 1502 via a first network 1598 (e.g., a short-range wireless communication network) or may communicate with at least one of an electronic device 1504 or a server 1508 via a second network 1599 (e.g., a long-range wireless communication network).

According to an embodiment of the disclosure, the electronic device 1501 may communicate with the electronic device 1504 via the server 1508. According to an embodiment of the disclosure, the electronic device 1501 may include the processor 1520, the memory 1530, an input module 1550, a sound output module 1555, the display module 1560, an audio module 1570, the sensor module 1576, an interface 1577, a connection terminal 1578, a haptic module 1579, the camera module 1580, a power management module 1588, a battery 1589, a communication module 1590, a subscriber identity module 1596, or an antenna module 1597. In some embodiments of the disclosure, the electronic device 1501 may not include at least one element (e.g., the connection terminal 1578) from among the elements or may further include one or more different elements. In some embodiments of the disclosure, some elements (e.g., the sensor module 1576, the camera module 1580, and the antenna module 1597) from among the elements may be integrated into one element (e.g., the display module 1560).

The processor 1520 may execute software (e.g., a program 1540) to control at least one different element (e.g., a hardware element or a software element) of the electronic device 1501 connected to the processor 1520, and may perform certain data processing or a computation. According to an embodiment of the disclosure, as a portion of the data processing or the computation, the processor 1520 may store, in a volatile memory 1532, a command or data received from another element (e.g., the sensor module 1576 or the communication module 1590), may process the command or the data stored in the volatile memory 1532, and may store resultant data in a non-volatile memory 1534. According to an embodiment of the disclosure, the processor 1520 may include a main processor 1521 (e.g., a central processing unit or an application processor) or an auxiliary processor 1523 (e.g., a graphics processing unit, a neural processing unit (NPU), an image signal processor, a sensor hub processor, or a communication processor) which independently operates or interoperates with the main processor 1521. For example, when the electronic device 1501 includes the main processor 1521 and the auxiliary processor 1523, the auxiliary processor 1523 may use lower power than the main processor 1521 or may be set to be specialized for a designated function. The auxiliary processor 1523 may be separately implemented or may be implemented as a portion of the main processor 1521.

Instead of the main processor 1521 while the main processor 1521 is in an inactive state (e.g., a sleeping state) or with the main processor 1521 while the main processor 1521 is in an active state (e.g., execution of an application), the auxiliary processor 1523 may control at least some of functions or states related to at least one element (e.g., the display module 1560, the sensor module 1576, or the communication module 1590) from among the elements of the electronic device 1501.

According to an embodiment of the disclosure, the auxiliary processor 1523 (e.g., the image signal processor or the communication processor) may be implemented as a portion of another element (e.g., the camera module 1580 or the communication module 1590) which is technically related to the auxiliary processor 1523. According to an embodiment of the disclosure, the auxiliary processor 1523 (e.g., the NPU) may include a hardware structure specialized for processing an artificial intelligence (AI) model.

The AI model may be generated through machine learning. The training may be performed by the electronic device 1501 in which the AI model runs or may be performed by a separate server (e.g., the server 1508). Examples of a learning algorithm may include, but not limited to, supervised learning, unsupervised learning, semi-supervised learning, or reinforcement learning. The AI model may include a plurality of artificial neural network layers. An artificial neural network may include any one or any combination of a deep neural network (DNN), a convolutional neural network (CNN), a recurrent neural network (RNN), a restricted Boltzmann machine (RBM), a deep belief network (DBN), a bidirectional recurrent deep neural network (BRDNN), and deep Q-networks, but is not limited thereto. The AI model may additionally or generally include a software structure, in addition to the hardware structure.

The memory 1530 may store certain data used by at least one element (e.g., the processor 1520 or the sensor module 1576) of the electronic device 1501. The data may include software (e.g., the program 1540), and input data or output data in response to a command related thereto. The memory 1530 may include the volatile memory 1532 or the non-volatile memory 1534. The non-volatile memory 1534 may include the built-in memory 1536 or the external memory 1538.

The program 1540 may be stored as software in the memory 1530, and may include an operating system 1542, middle-ware 1544, or an application 1546.

The input module 1550 may receive a command or data to be used by an element (e.g., the processor 1520) of the electronic device 1501 from an external source (e.g., a user) of the electronic device 1501. Examples of the input module 1550 may include a microphone, a mouse, a keyboard, a key (e.g., a button), or a digital pen (e.g., a stylus pen).

The sound output module 1555 may output a sound signal to the outside of the electronic device 1501. The sound output module 1555 may include a speaker or a receiver. The speaker may be used for a general use such as reproduction of multimedia content or playback of recording. The receiver may be used to receive an incoming call. According to an embodiment of the disclosure, the receiver may be separately implemented or may be implemented as a portion of the speaker.

The display module 1560 may visually provide information to an external source (e.g., a user) of the electronic device 1501. The display module 1560 may include a display, a hologram device, or a projector, and a control circuit for controlling a corresponding device. According to an embodiment of the disclosure, the display module 1560 may include a touch sensor configured to detect a touch, or a pressure sensor configured to measure a strength of power occurring due to the touch.

The audio module 1570 may convert sound into an electrical signal, or alternatively may convert an electrical signal into sound. According to an embodiment of the disclosure, the audio module 1570 may obtain sound via the input module 1550, or may output sound via an external electronic device (e.g., the electronic device 1502) that is directly or wirelessly connected to the electronic device 1501.

The sensor module 1576 may detect an operation state (e.g., power or a temperature) of the electronic device 1501 or an external environment state (e.g., a user's state), and may generate an electrical signal or a data value which corresponds to the detected state. According to an embodiment of the disclosure, the sensor module 1576 may include, but is not limited to, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more designated protocols that are usable by the electronic device 1501 to be directly or wirelessly connected to an external electronic device (e.g., the electronic device 1502). According to an embodiment of the disclosure, the interface 1577 may include a high definition multimedia interface (HDMI), a universal serial bus (USB) interface, a secure digital (SD) card interface, or an audio interface.

The connection terminal 1578 may include a connector via which the electronic device 1501 can be physically connected to an external electronic device (e.g., the electronic device 1502). According to an embodiment of the disclosure, the connection terminal 1578 may include an HDMI connector, a USB connector, an SD card connector, or an audio connector (e.g., a headphone connector).

The haptic module 1579 may convert an electrical signal into a mechanical stimulus (e.g., a vibration or motion) or an electrical stimulus which is perceivable to a user through a tactile sense or motor sense. According to an embodiment of the disclosure, the haptic module 1579 may include a motor, a piezoelectric element, or an electric stimulation device.

The camera module 1580 may capture a still image and a moving picture image. According to an embodiment of the disclosure, the camera module 1580 may include one or more lenses, image sensors, image signal processors, or flashes.

The power management module 1588 may manage power to be supplied to the electronic device 1501. According to an embodiment of the disclosure, the power management module 1588 may be implemented as at least a portion of a power management integrated circuit (PMIC).

The battery 1589 may supply power to at least one element of the electronic device 1501. According to an embodiment of the disclosure, the battery 1589 may include a primary cell that cannot be recharged, a rechargeable secondary cell, or a fuel cell.

The communication module 1590 may support set-up of a direct (e.g., wired) communication channel or a wireless communication channel between the electronic device 1501 and an external electronic device (e.g., the electronic device 1502, the electronic device 1504, or the server 1508), and communication via the set communication channel. The communication module 1590 may include one or more communication processors that operate independently from the processor 1520 (e.g., the application processor) and support direct (e.g., wired) communication or wireless communication. According to an embodiment of the disclosure, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication module). A corresponding communication module from among the communication modules may communicate with the external electronic device 1504 via the first network 1598 (e.g., a short-range communication network such as Bluetooth, wireless fidelity (Wi-Fi) Direct, or infrared data association (IrDA)) or the second network 1599 (e.g., a long-range communication network such as a legacy cellular network, a $5^{th}$-generation (5G) network, a next-generation communication network, Internet, or a computer network (e.g., a LAN or a wide area network (WAN)). These certain communication modules may be integrated into one element (e.g., a single chip) or may be implemented as separate elements (e.g., a plurality of chips). The wireless communication module 1592 may verify or authenticate the electronic device 1501 in a communication network such as the first network 1598 or the second network 1599, by using subscriber information (e.g., international mobile subscriber identity (IMSI)) stored in the subscriber identity module 1596.

The wireless communication module 1592 may support the 5G network and a next-generation communication technology such as a new radio (NR) access technology after a $4^{th}$-generation (4G) network. The NR access technology may support high-speed transfer of large amount of data (enhanced mobile broadband (eMBB), minimization of terminal power and access of multiple terminals (massive machine type communications (mMTC)), or ultra-reliable and low-latency communications (URLLC). The wireless communication module 1592 may support a high frequency band (e.g., a millimeter-wave (mmWave) band) so as to achieve a high data rate. To assure capabilities in the high frequency band, the wireless communication module 1592 may support certain technologies such as beamforming, massive multiple-input and multiple-output (massive MIMO), full-dimension MIMO (FD-MIMO), an array-antenna, analog beamforming, or a large-scale antenna. The wireless communication module 1592 may support certain requirements specified in the electronic device 1501, an external electronic device (e.g., the electronic device 1504), or a network system (e.g., the second network 1599). According to an embodiment of the disclosure, the wireless communication module 1592 may support a peak data rate (e.g., 20 Gbps or more) for realization of the eMBB, loss coverage (e.g., 164 dB or less) for realization of the mMTC, or U-plane latency (e.g., 0.5 ms or less for each of downlink (DL) and uplink (UL), or 1 ms or less for one round trip) for realization of the URLLC.

The antenna module 1597 may transmit or receive a signal or power to or from an external entity (e.g., an external electronic device). According to an embodiment of the disclosure, the antenna module 1597 may include an antenna including a conductor formed on a substrate (e.g., a printed circuit board (PCB)) or a radiator of a conductive pattern. According to an embodiment of the disclosure, the antenna module 1597 may include a plurality of antennas (e.g., the array-antenna). In this case, at least one antenna that is appropriate for a communication scheme to be used in a communication network such as the first network 1598 or the second network 1599 may be selected from the plurality of antennas by the communication module 1590. A signal or power may be transmitted or received between the communication module 1590 and an external electronic device via the selected at least one antenna. According to some embodiments of the disclosure, in addition to the radiator, another part (e.g., a radio frequency integrated circuit (RFIC)) may be added to be formed as a part of the antenna module 1597. According to certain embodiments of the disclosure, the antenna module 1597 may configure an mmWave antenna module. According to an embodiment of the disclosure, the mmWave antenna module may include a PCB, an RFIC arranged on a first surface (e.g., a bottom surface) of the PCB or adjacent to the first surface and enabled to support a designated high frequency band (e.g., an mmWave band), and a plurality of antennas (e.g., an array-antenna) arranged on a second surface (e.g., a top surface or a side surface) of the PCB or adjacent to the second surface and enabled to transmit or receive a signal of the designated high frequency band.

At least some of the elements may be connected to each other using a communication scheme (e.g., a BUS, general-purpose input and output (GPIO), serial peripheral interface (SPI), or mobile industry processor interface (MIPI)) for peripheral devices, and may exchange a signal (e.g., a command or data) therebetween.

According to an embodiment of the disclosure, the command or the data may be transmitted or received between the electronic device 1501 and the external electronic device 1504 via the server 1508 connected to the second network 1599. Each of the external electronic devices 1502 and 1504 may be a same type device or different type device with respect to the electronic device 1501. According to an embodiment of the disclosure, all or some of operations performed in the electronic device 1501 may be performed by one or more electronic devices from among the external electronic devices 1502, 1504, and 1508. For example, when it is required for the electronic device 1501 to perform a certain capability or service automatically or in response to a request from a user or another device, the electronic device 1501 may request the one or more electronic devices to perform at least a portion of the capability or service, instead of performing the capability or the service in the electronic device 1501. When the one or more electronic devices receive the request, the one or more electronic devices may perform the requested portion of the capability or service or an additional capability or service associated with the request, and may transmit a result of the performing to the electronic device 1501. The electronic device 1501 may changelessly or additionally process the result, and thus, may provide the processed result as a portion of a response to the request. To this end, for example, cloud computing, distributed computing, mobile edge computing (MEC), or client-server computing technology may be used. The electronic device 1501 may provide an ultra-low latency service by using the distributed computing or the MEC. In another embodiment of the disclosure, the external electronic device 1504 may include an Internet of things (IoT) device. The server 1508 may be an intelligent server using machine learning and/or a neural network. According to an embodiment of the disclosure, the electronic device 1504 or the server 1508 may be included in the second network 1599. The electronic device 1501 may be applied to intelligent services (e.g., smart homes, smart cities, smart cars or health care) based on the 5G communication technology and IoT-related technology.

Figure 16:
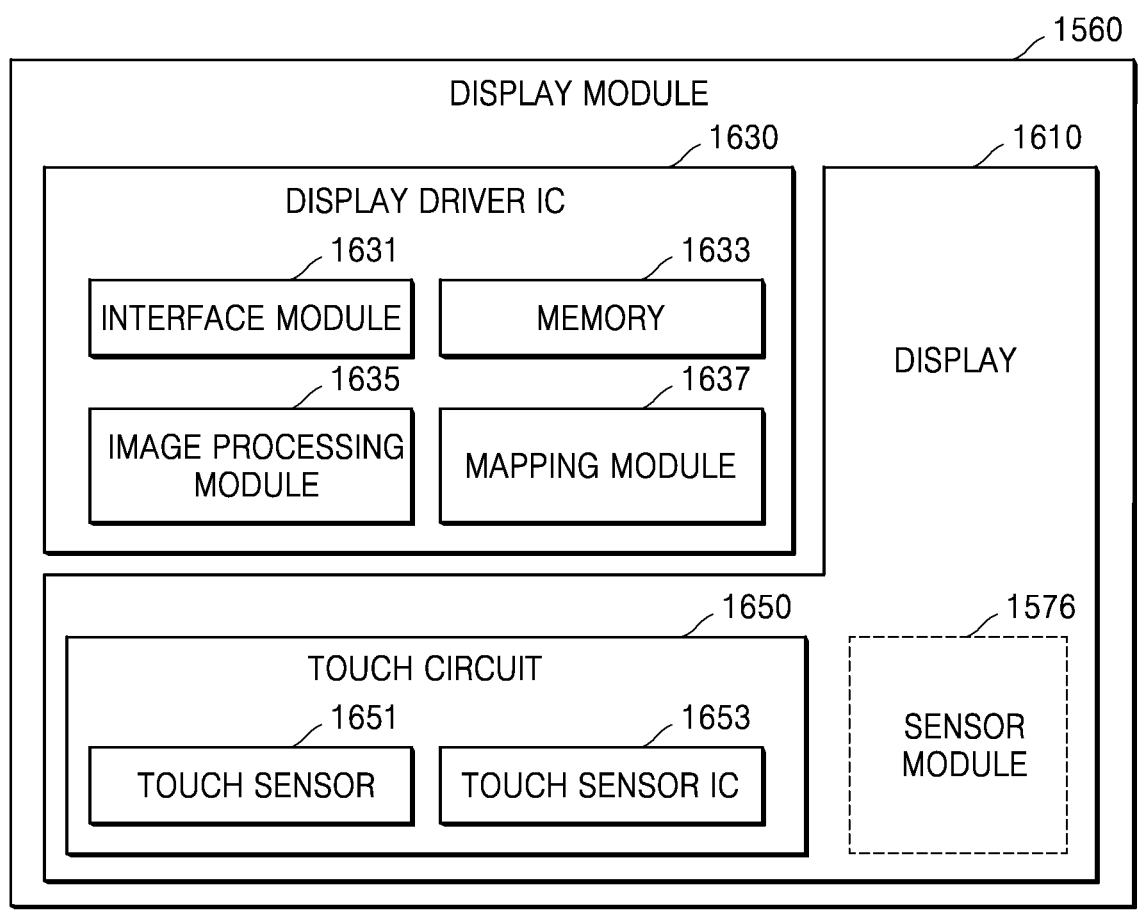
FIG. 16 is a block diagram of a display module, according to an embodiment of the disclosure.

FIG. 16 is a block diagram of the display module 1560, according to an embodiment of the disclosure.

According to an embodiment of the disclosure, the display module 1560 of FIG. 16 may indicate the display 1100 of FIG. 1.

Referring to FIG. 16, the display module 1560 may include a display 1610, and a display driver integrated circuit (DDI) 1630 for controlling the display 1610. The DDI 1630 may include an interface module 1631, a memory 1633 (e.g., a buffer memory), an image processing module 1635, or a mapping module 1637. The DDI 1630 may receive image data or image information including an image control signal corresponding to a command for controlling the image data, from another element of the electronic device 1501 via the interface module 1631. For example, according to an embodiment of the disclosure, the image information may be received from the processor 1520 (e.g., the application processor as the main processor 1521 or the graphics processing unit as the auxiliary processor 1523 that operates independently from functions of the main processor 1521). The DDI 1630 may communicate with a touch circuit 1650 or the sensor module 1576 via the interface module 1631. Also, the DDI 1630 may store at least a portion of the received image information, the portion being in the units of frames, in the memory 1633. The image processing module 1635 may perform pre-processing or post-processing (e.g., adjustment of resolution, brightness, or size) on the at least portion of the image data, based on a characteristic of the image data or a characteristic of the display 1610. The mapping module 1637 may generate a voltage value or a current value which corresponds to the image data pre-processed or post-processed by the image processing module 1635. According to an embodiment of the disclosure, the generating of the voltage value or the current value may be performed based on at least some of attributes of pixels (e.g., an array of the pixels (e.g., a RGB stripe or a PenTile matrix) or a size of each of sub-pixels) of the display 1610. At least some of the pixels of the display 1610 may be driven based on at least a portion of the voltage value or the current value, such that visual information (e.g., a text, an image, or an icon) corresponding to the image data may be displayed on the display 1610.

According to an embodiment of the disclosure, the display module 1560 may further include the touch circuit 1650. The touch circuit 1650 may include a touch sensor 1651 and a touch sensor IC 1653 for controlling the touch sensor 1651. The touch sensor IC 1653 may control the touch sensor 1651 to detect a touch input or a hovering input with respect to a particular position on the display 1610. For example, the touch sensor IC 1653 may detect the touch input or the hovering input by measuring a change (e.g., a voltage, the amount of light, a resistance, or quantity of electronic charge) in a signal with respect to the particular position on the display 1610. The touch sensor IC 1653 may provide the processor 1520 with information (e.g., a position, an area, a pressure, or a time) about the detected touch input or the detected hovering input. According to an embodiment of the disclosure, at least a portion (e.g., the touch sensor IC 1653) of the touch circuit 1650 may be included as a part of the DDI 1630 or the display 1610, or a part of another element (e.g., the auxiliary processor 1523) arranged outside the display module 1560.

According to an embodiment of the disclosure, the display module 1560 may further include at least one sensor (e.g., a fingerprint sensor, an iris sensor, a pressure sensor, or an illuminance sensor) of the sensor module 1576, or a control circuit with respect to the at least one sensor of the sensor module 1576. In this regard, the at least one sensor or the control circuit with respect to the same may be embedded in a portion (e.g., the display 1610 or the DDI 1630) of the display module 1560 or a portion of the touch circuit 1650. For example, when the sensor module 1576 embedded in the display module 1560 includes a biometric sensor (e.g., a fingerprint sensor), the biometric sensor may obtain biometric information (e.g., a fingerprint image) related to a touch input via a certain area of the display 1610. As another example, when the sensor module 1576 embedded in the display module 1560 includes a pressure sensor, the pressure sensor may obtain pressure information related to a touch input via a certain area or an entire area of the display 1610. According to an embodiment of the disclosure, the touch sensor 1651 or the sensor module 1576 may be arranged between pixels of a pixel layer of the display 1610 or may be arranged above or below the pixel layer.

According to an embodiment of the disclosure, an electronic device may provide a user with content with a larger screen, without a wasted display region, and thus, may provide the user with an experience in which the user can immerse himself/herself in the content.

According to an embodiment of the disclosure, the electronic device may determine a first region of a display on which a first portion of content is to be displayed, based on at least one of information about a type of content, information about an application that provides content, information indicating whether content include text content, or information indicating whether content and a user interface (UI) to receive a user input overlay each other.

According to an embodiment of the disclosure, the electronic device may obtain a location of a user, and may generate an image corresponding to a second portion of the content, based on the obtained location of the user and an angle between the first region and a second region of the display.

What is claimed is:
1. A method for displaying content on a flexible display of an electronic device that is foldable, the method comprising:
   determining, based on information about the content, a first region of the flexible display on which a first portion of the content is to be displayed from among two regions of the flexible display, wherein the information about the content indicates at least one of a type of the content, an application providing the content, or whether the content and a user interface (UI) for receiving a user input overlay each other;
   obtaining an angle between the first region and a second region of the display, the second region being distinguished from the first region according to folding of the flexible display;
   determining, based on the angle and a location of a user, a size and a ratio of correction content to allow the first portion of the content and a second portion of the content to be displayed on one virtual plane;
   generating, based on the size and the ratio, the correction content including a second portion of the content; and
   displaying the first portion on the first region, and displaying the correction content on the second region so that the first portion and the correction content are displayed on the virtual plane aligned to the first region, wherein when the type indicates an image, the second region is divided into third and fourth subregions, such that the UI is displayed to the third subregion and the correction content is displayed to the fourth subregion, and wherein the third subregion including the UI is visually orthogonal to the virtual plane aligned to the first region, and the fourth subregion including the correction content is coplanar with the virtual plane.

2. The method of claim 1, wherein the location of the user is deemed a predetermined default location, and the method further comprises:

displaying the image such that two edges of the image contact two edges of the first region, while two other edges of the image are distal from two remaining edges of the first region, wherein the size and the ratio of the correction content are determined such that a first portion of the image is displayed in the first region contacting at least three edges of the first region, and a second portion of the image is displayed as the correction content that is coplanar with the virtual plane aligned to the first region.

3. The method of claim 2, wherein the predetermined default location comprises a predetermined default distance from the electronic device, and predetermined default angle with respect to the electronic device.

4. The method of claim 1, further comprising obtaining a location of the user, and wherein the correction content corresponding to the second portion of the content is generated based on the angle and the obtained location of the user.

5. The method of claim 4, wherein the obtained location of the user comprises a measured distance between the electronic device and the user, and measured angle between the electronic device and the user.

6. The method of claim 1, further comprising splitting the content into the first portion and the second portion.

7. The method of claim 6, wherein a length of one side of the content is equal to a length of one side of the first region.

8. An electronic device comprising:

a flexible display;

one or more sensors;

a memory storing at least one instruction; and at least one processor configured to execute the at least one instruction to perform a plurality of operations, wherein the plurality of operations comprises:

determining, based on information about content, a first region of the display on which a first portion of the content is to be displayed from among two regions of the flexible display, wherein the information about the content indicates at least one of a type of the content, an application providing the content, or whether the content and a user interface (UI) for receiving a user input overlay each other, obtaining, via the one or more sensors, an angle between the first region and a second region of the display, the second region being distinguished from the first region according to folding of the flexible display, determining, based on the angle and a location of a user, a size and a ratio of correction content to allow the first portion of the content and a second portion of the content to be displayed on one virtual plane, generating, based on the size and the ratio, the correction content including a second portion of the content; and displaying the first portion on the first region, and displaying the correction content on the second region so that the first portion and the correction content are displayed on the virtual plane aligned to the first region, wherein when the type indicates an image, the method further comprises:

displaying the image such that two edges of the image contact two edges of the flexible display, while two other edges of the image are distal from two remaining edges of the flexible display, wherein the size and the ratio of the correction content are determined such that a first portion of the image is displayed in the first region contacting at least three edges of the flexible display, and a second portion of the image is displayed as the correction content that is coplanar with the virtual plane aligned to the first region.

9. The electronic device of claim 8, wherein the location of the user is deemed a predetermined default location, and the plurality of operations further include:

displaying the image such that two edges of the image contact two edges of the first region, while two other edges of the image are distal from two remaining edges of the first region, wherein the size and the ratio of the correction content are determined such that a first portion of the image is displayed in the first region contacting at least three edges of the first region, and a second portion of the image is displayed as the correction content that is coplanar with the virtual plane aligned to the first region.

10. The electronic device of claim 9, wherein the predetermined default location of the user comprises a predetermined default distance between the electronic device and the user, and a predetermined default angle between the electronic device and the user.

11. The electronic device of claim 8, wherein the plurality of operations further comprises obtaining a location of the user, and wherein the correction content corresponding to the second portion of the content is generated based on the angle and the obtained location of the user.

12. The electronic device of claim 11, wherein the obtained location of the user comprises a measured distance between the electronic device and the user, and measured angle between the electronic device and the user.

13. The electronic device of claim 8, wherein the processor is further configured to execute the at least one instruction to split the content into the first portion and the second portion.

14. The electronic device of claim 13, wherein a length of one side of the content is equal to a length of one side of the first region.

15. The electronic device of claim 8, further comprising:

a first housing; and a second housing, and wherein the first region is positioned in the first housing, and the second region is positioned in the second housing.

16. A non-transitory computer-readable recording medium having recorded thereon a program executable by a processor of an electronic device, to cause the electronic device to:

determine, based on information about a content, a first region of a flexible display on which a first portion of the content is to be displayed from among two regions of the flexible display, wherein the information about the content indicates at least one of a type of the content, an application that provides the content, or whether the content and a user interface (UI) for receiving a user input overlay each other;

obtain an angle between the first region and a second region of the display, the second region being distinguished from the first region according to folding of the flexible display;

determine, based on the angle and a location of a user, a size and a ratio of correction content to allow the first portion of the content and a second portion of the content to be displayed on one virtual plane;

generate, based on the size and the ratio, the correction content including a second portion of the content; and display the first portion on the first region, and displaying the correction content on the second region so that the first portion and the correction content are displayed on the virtual plane aligned to the first region, wherein when the type indicates an image, the second region is divided into third and fourth subregions, such that the UI is displayed to the third subregion and the correction content is displayed to the fourth subregion, and wherein the third subregion including the UI is visually orthogonal to the virtual plane aligned to the first region, and the fourth subregion including the correction content is coplanar with the virtual plane.

* * * * *